United States Patent
O'Neill

[11] Patent Number: 5,056,049
[45] Date of Patent: Oct. 8, 1991

[54] POSITION TRANSMITTER

[76] Inventor: Timothy P. O'Neill, 1176 Blue Bird Canyon Trail, Vista, Calif. 92084

[21] Appl. No.: 425,069

[22] Filed: Oct. 23, 1989

[51] Int. Cl.$^5$ ............................................. G01F 23/62
[52] U.S. Cl. .................................. 364/562; 340/623; 63/308
[58] Field of Search .................... 364/562; 340/870.03, 340/612, 615, 618–620, 623; 73/305, 306, 308, 309, 313, 314

[56] References Cited

U.S. PATENT DOCUMENTS

| | | | |
|---|---|---|---|
| 3,473,381 | 10/1989 | Allen, Jr. | 73/314 |
| 3,947,692 | 3/1976 | Payne | 340/618 |
| 4,056,979 | 11/1977 | Bongort et al. | 73/313 |
| 4,084,436 | 4/1978 | Smitherman | 73/313 |
| 4,361,835 | 11/1982 | Nagy | 340/618 |
| 4,589,282 | 5/1986 | Dumery | 73/313 |

*Primary Examiner*—Thomas G. Black

[57] ABSTRACT

A digital position transmitter is disclosed which uses a fixed array of physicoelectric proximity switches to locate a physical exciter and transmit the position of the exciter as a hexadecimal coded number or as a string of pulses. The position transmitter uses solid state components, has no moving parts and requires less power than any one proximity operated alone. The transmitter attains moderate resolution while displaying excellent accuracy and precision. The transmitter is completely non-intrusive; there is no contact between the physical exciter and the switch array, making the transmitter particularly suited for determining the position of objects that must be completely isolated because of pressure, temperature, of chemical hazards. Further circuits are described for converting the inherently digital output signal to industrial standard 4–20 mA or voltage signals. Applications are described for determining the "fullness" of a constant pressure cylinder used in sampling liquids and gaseous materials from pipelines, the status of hydraulic valve positioners the liquid level contained in storage vessels, and differential pressure. Practical variations of the physicoelectric proximity switch array are described for applying the position transmitter to movements as small as one inch and as large as hundreds of feet.

50 Claims, 3 Drawing Sheets

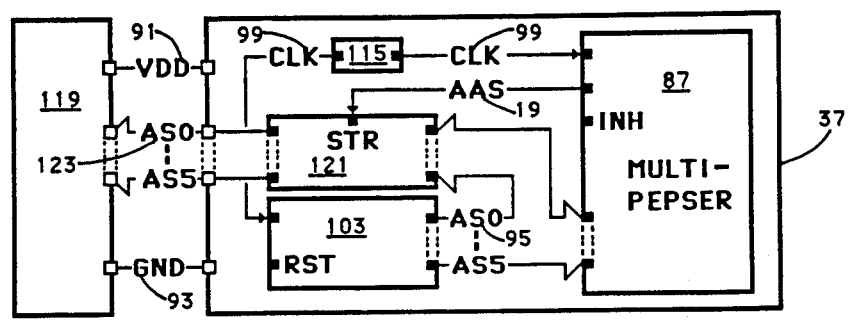
FIG. 8
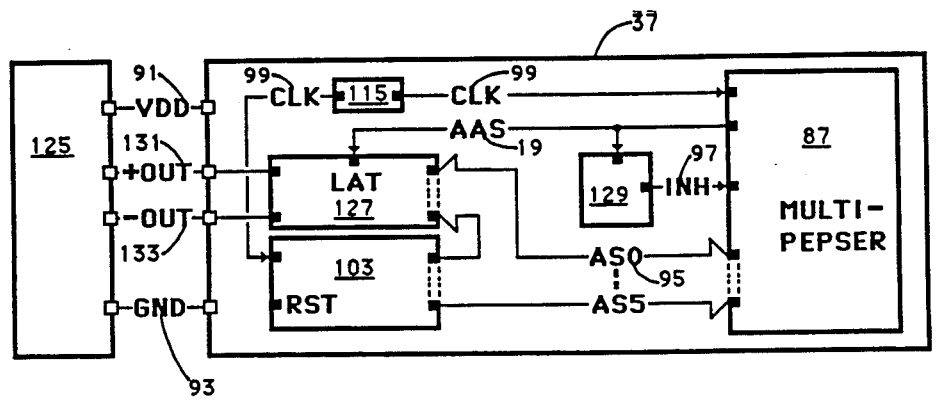
FIG. 9
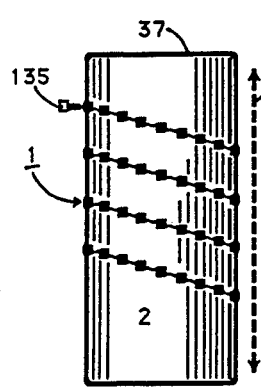
FIG. 10
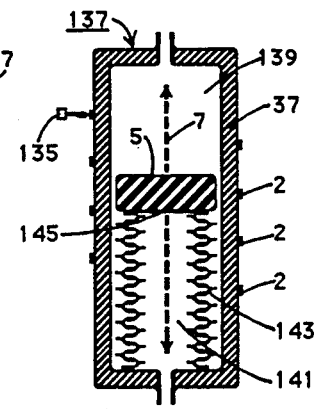
FIG. 11
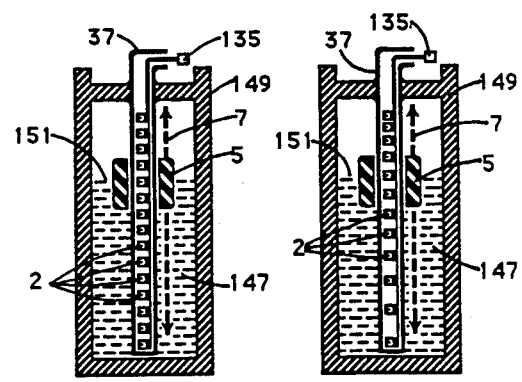
FIG. 12
FIG. 13

POSITION TRANSMITTER

BACKGROUND OF THE INVENTION

The present invention relates to a device for transmitting the position of an object that is contained within a closed vessel and has no direct connection with the device, and more particularly concerns a device that is digital in design, solid-state in construction, low in cost, versatile in application, extremely low in power consumption, and simple in installation and that transmits an output signal that has the qualities of high precision, drift-free accuracy, excellent noise immunity, and moderate resolution.

At the present time there are a number of industrial processes that utilize the general combination of a piston or float contained within a closed vessel. The vessel is used to contain the process fluids and separate them from the ambient environment while the piston or float is used to indicate the current stage of the process. Some general examples of these processes include rotameter-type flow meters, pressure indicators, storage vessels for hazardous or flammble chemicals, containment systems for excess pressure, and any process isolated for it's hazards.

The present invention was originally developed to meet the needs of the particular process known as continuous composite sampling within the specific Oil and Gas Industry but is not limited in application to that particular process or to that particular industry.

Continuous composite sampling is a measurement system that answers the question "what is the composition and therefore value per unit of flow" of the petroleum product that was received, produced, or transported, at a specific location, during a specific period of time? It is related to general measurement systems that include volume and mass flowmeters, density meters, calorimeters, gravitometers, process chromatographs, and viscocity meters.

Two other popular schemes for analyzing the quality or value of petroleum fluids include direct process analysis and batch analysis. All three schemes share the steps of store, extract, mix and analyze but each scheme performs the steps in a different order.

In batch sampling the entire amount of the fluid that is processed during the sampling period is stored and mixed before a sample is extracted and analyzed and before the fluid is available for further processing. The fact that the fluid is unavailable for further processing until the end of the period causes the batch sampling method to be impractical for processes involving large quantities of fluid and long sampling periods; the storage vessel would be enormous and the flow would be interrupted by the storage step. Trying to batch sample a continuous process, such as large pipeline flow is inherently impractical. Note however, that batch sampling is the most straightforward in concept and trouble-free in practice and serves as a standard for evaluation of the other schemes.

In process analysis thousands of samples are extracted and analyzed during any sampling period. The result of each analysis is electronically mixed with other current process parameters such as flow, temperature and pressure, and the integrated data is stored. The integrated data can be retrieved on demand and totalled for any time period without destroying the original data. Process analysis can be very accurate but uses complicated equipment that is expensive to purchase, difficult to maintain, and complicated to operate and must normally be housed in an air conditioned building. Therefore this scheme is impractical for remote, unmanned locations with a small power supply and is difficult to justify unless the economics of the process are favored by detailed, up-to-date analytical information.

Composite sampling is also called continuous sampling, continuous composite sampling, representative sampling, proportional sampling, or simply gas sampling, and is the scheme for which the present invention is developed.

In composite sampling, a very small but controlled quantity of fluid is extracted at frequent intervals from the process flow and stored in the sample vessel during a sampling period that is typically a week or a month. At the end of the sample period, the sample vessel is removed to the laboratory, the fluid is mixed within the vessel to stabilize the composition, and then the contents of the vessel are analyzed. If the sampling is accurate, the results of this single, end-of-the-period analysis are representative of the total amount of fluid that was processed during the period. An accurate sample is composed of thousands of individual extractions, where the quantity of each extraction and the frequency of extractions is precisely controlled by either a process flow signal or a timer.

In theory, the sample vessel is a small replica of the enormous storage vessel from the batch sampling scheme and each extraction is a small replica of the fluid that is processed between extractions. Note that typically the volume of the sample vessel is less than 1 liter, while the volume of the total process flow is greater than 1 million liters.

The essential components of a composite sampler are the controller, the sample extractor and the sample vessel. The present invention has been developed to transmit the level of fullness of the particular type of sample vessel that is generally referred to as a "constant pressure cylinder".

In it's simplest form the sample vessel consists of a small, high pressure cylinder with a valve at one or both ends and a pressure gauge or transmitter to indicate the state of fullness. This type of sample vessel is referred to as a "constant volume cylinder" and is typically used when the fluid to be sampled is primarily in the gas phase so that the pressure reading is a reliable indication of how much fluid has been sampled.

By contrast, the constant pressure cylinder is a complex device, consisting of a precision bored and polished cylinder that has been clamped between two precision fitted endcaps and that has been separated into two chambers by a ringed piston that will not allow fluid to pass between the chambers but will slide freely within the cylinder, varying the volume of each chamber until their pressures are equal. There is usually a valve, a pressure relief device and a pressure gauge at each end.

The constant pressure cylinder can be used to sample fluids in either the gas or liquid phase and it is the position of the piston within the cylinder, and not the pressure, that indicates the state of fullness. The position of the piston is a direct volume indication of how much fluid is currently stored in the sample vessel.

It is difficult to determine the position of this piston because, by function and design, the piston must be surrounded on the sides by the steel walls of the cylinder and at the ends by the pressurized petroleum fluids and further because the interior of the cylinder should be practically free of devices or pressure seals that would compromise the integrity of the sampled fluid. It is this relative isolation of the piston and the strict requirements of sample integrity that favors the use of a non-contact position transducer and causes the commercially available, low cost position transducers of the prior art to be unreliable or hazardous.

To date, the most common and reliable solution has been to fit the end of the piston with a set of three ring magnets, and to attach a linear array of magnetic flags along the outside of the cylinder; as the piston moves along the cylinder the advancing magnetic field causes the flags to turn over, exposing a side of a different color.

Another common indicator, closely related to the one described above, utilizes rod magnets that are embedded in the piston and the magnetic flag array is replaced by a brightly colored magnetic tracker contained within a clear plastic tube. The colored tracker is magnetically coupled to the magnets in the piston and therefore follows it's movement.

The major drawback to both these types of indicators is that they are only indicators and not transmitters; a human operator must go out to the sampling location and visually inspect the indicator in order to determine the position of the piston and therefore the current state of fullness of the sample vessel. In order to ascertain the operability of the composite sampler the operator would be required to make a number of observations over the course of the sampling period.

This is a noteworthy drawback especially considering that one of the application advantages of the composite sampler over process analysis and batch analysis is that composite sampling does not require an on-site operator and is practical at small or physically remote process locations. These advantages are severely compromised if an operator is required to make the number of observations necessary to ascertain that the sampling system is functioning properly.

Another drawback specific to the magnetic tracker type indicator is that the tracker can become decoupled from the piston due to fast piston movement or to accidental jarring. Once this decoupling occurs it must be identified and corrected by an operator.

A constant goal of the modern chemical and petroleum industries has been to automate the measurement and control of the most vital processes. The emphasis from the measurement side has been to develop a network of distributed transducers that determine the physical properties or quantities of the processes and transmit a proportional electronic signal to a central control computer. Reliable electronic transmitters have been developed for most of the basic operating properties of modern petroleum processes: temperature, pressure, density, flow, level, and even for some that are more complex such as viscosity, chemical composition, moisture and $H_2S$ content and heating value.

One of the critical operating variables that is still only available from an indicator and that is not now electronically transmittable is the operation and "state of fullness" of the constant pressure sample vessel.

To overcome these shortcomings of the prior art, the present invention is provided to electronically sense the position of the piston and to transmit an electronic signal that is proportional to that position. The electronic signal can then be monitored by the typical programmable process controller, telemetering station, central control computer, or data acquisition system. The fact that an electronic signal is able to be transmitted eliminates the need for visual inspection and/or an operator.

The present invention is developed to take advantage of the prior art by making good use of the fact that almost all of the existing constant pressure cylinders are already fitted with magnets in order to operate the flag or tracker indicating systems. This invention is provided to directly sense the magnetic fields of the existing piston magnets in such a way that it can be added to an existing sample vessel without any necessary retrofitting and without interferring with the well-established indicator systems. This invention is operable by simply securing it within close proximity to the outside of the sample vessel in a generally parallel orientation and supplying it with the connections to a power supply and for a signal output; it requires no direct connection or even contact with the sample vessel or other sampler components.

The fact that this invention does not require direct contact or modification of the sample vessel is important because at the end of any one particular sampling period the full vessel is removed for analysis and replaced by another, empty vessel. The "no-contact" operation of this invention greatly simplifies the exchange process and again saves operator time.

Because of the variety of sample vessels used in industry, the second sample vessel, in almost every exchange, will have a different magnetic field from the first. This invention accommodates a wide variety of different magnetic fields and still produces a precise and accurate output signal.

The problem of variety in the magnetic field is exacerbated by the fact that the magnets are typically of large physical size but of only medium magnetic concentration, due to the variety of outer coverings that are used to protect the vessel and by the thickness of the cylinder wall.

Thus, the magnetic fields are typically large in size, low in strength, irregular in pattern and significantly isolated from any type of sensor system. This means that transmitters or transmitter systems that are simple and straight-forward or that are already commercially available are not very useful; a new, innovative transmitter, with a unique sensor array network and unique logic is required in order to have solid-state reliability in a reasonably accurate position transmitter.

Electronic transmitting means can be divided into two major groups according to the predominant signal circuitry; digital or analog. A digital device consists of electronic logic gates whose outputs can change only between a limited number of voltages and that transmits information in discrete form. Specifically, a simple binary digital signal has only two states that are defined by two voltage levels and thus a single data line can only transmit either a 0 or a 1 with in-between levels of voltage rejected as invalid transitional data. On the other hand, an analog device consists of electronic control circuits whose output varies smoothly and continuously in amplitude through a range of voltages or currents and that transmits information of infinite resolution over only one or two data lines.

Many common analog transmitters are designed around an electrical resistance network whose resistance value is determined by the value of the physical property in question. As an example, in a fluid pressure transmitter the resistance value of a strain gauge network is determined by the amount of strain exerted on a diaphragm by the pressure of the fluid acting on that diaphragm. In simple analog position transmitters, based on the use of a potentiometer, the resistance value of the electrical network is held constant while a moveable contact point that follows the position of the object in question divides the network proportionally and is used as the principal raw data line.

The most common digital transmitter with a single data output line is a switch; a device that changes output states when a physical property reaches predetermined values. The switch circuitry routes the analog output of a simple transducer directly into a comparator whose output switches to a high state (1) when the transducer's output rises above the set point, and to a low state (0) when the transducer's output falls below the reset point. Switch circuitry is commonplace and has been commercially developed to be sensitive to any number of physical properties and events including pressure, temperature, light, movement, acceleration, force, magnetic field, and the presence of inductive cores or capacitive plates. Switch outputs inherently lack resolution because each output can only transmit whether the physical property is above or below the setpoints.

Digital transmitters often attain a high degree of resolution with a single switch by monitoring the output of the switch to determine how many switching events occur during a specified length of time. Simple switch-based transmitters that utilize the concepts of time and count have been most successfully developed for measurement of flow, speed, and other time dependent processes.

Each major group, analog or digital, has advantages over the other. The signal from a digital device is usually more precise, independent of drifting power levels, and does not require amplification but, because of the binary nature of digital circuits, a digital signal of moderate resolution will consist of at least six to eight places transmitted over that number of parallel data lines. The signal from an analog device is easily transmitted over a single line but it generally requires amplification and thus increased power consumption, and it's accuracy is dependent on changes in power levels, temperature and electrical noise. A digital device usually consumes less power than an analog device, but typically requires more components in the form of complex gated circuitry and a more complex time-multiplexed logic scheme.

A simple transmitter is usually designed around only analog or digital circuits and therefore inherits the disadvantages of that circuit group. Of course, more complex "smart" microprocessor-based transmitters and complex computer interface systems combine the advantages of both analog and digital logic by generating raw analog data from a transducer and converting this data to digital form for processing, and then either reconverting the processed digital data to an analog signal, and transmitting the analog signal, or transmitting the digital data using the modulation techniques of a telephone modem or a conventional serial protocol such as RS-232. But accurate converter schemes are complex and expensive and consume more power than is practical, while modulation circuits are not only very complex, expensive and impractical but typically require either additional control lines (synchronous) or a third digital state defined as "no signal" (asynchronous).

The present invention combines the beneficial digital characteristics of high precision, high noise immunity and drift-free accuracy with the beneficial analog characteristics of simple, straight-forward logic, relatively few components, and one data line, while retaining the characteristics that are desired in a marketable position transmitter; low cost, easy installation, low power consumption, moderate resolution, and solid-state reliability.

These goals are achieved principally by taking advantage of the industrial process's requirements for response time. Industrial processes such as sampling fullness, level, and steady flow typically register significant change in terms of hours or days so that a transmitter with a response time of several minutes is more than adequate for maintaining the data as significant.

This response time of several minutes is used only as an example of the upper limits of response time; the present invention operates quite efficiently with a response time of tenth seconds. Note also, that although this sounds significantly slower than microprocessors operating at speeds of 10 MHz or 10 million steps per second, the overall response times for significant data updates in such microprocessor systems typically ranges from one to hundreds of milliseconds. Thus the response time of the present invention running at a fast speed is comparable to a slow microprocessor-controlled analog to digital conversion scheme.

The typical microprocessor based device exploits this conversion time to perform thousands of very fast operations while the present invention performs less than a hundred relatively slow operations to achieve a comparable response time. The typical microprocessor transmitting device consumes large amounts of power and time for controlling the excitation of the analog transducer, on converting and mathematically manipulating the data, and on synchronizing the data for transmission via a standard protocol. Only a small amount of time is consumed on performing the essential steps of monitoring the data and transmitting it. The present invention significantly reduces the number of operations by eliminating the need for the support operations described above, by retaining only the essential operations of sampling and transmitting, and by performing both of these operations simultaneously.

The present invention combines the network concept of analog circuitry with the switch concept of digital circuitry in order to produce a position transmitter device consisting of a network of proximity switches, a digital controller circuit, and a physical exciter that is coupled to the position of the object being monitored. The proximity switches are also referred to as physicoelectric proximity switches to designate a switch whose electric properties are influenced by the presence of the physical exciter. The present invention further transmits a string of pulses which can be routed simultaneously to the data output circuit and to the controller circuit such that the number of pulses in the string is directly proportional to the position of the object being monitored.

In one embodiment of the present invention, the network or sensor array circuit is a group of from 16 to 256 magnetically operated digital proximity switches whose power input lines are connected in a matrix of rows and columns and controlled by a power multiplexing circuit and whose data output lines are connected to form a single common sensor array output line. The power multiplexing circuit is addressed in hexadecimal code sent from the controller and is active as long as data pulses are generated. The physical exciter is a magnet.

When the power multiplexer is active, it connects positive voltage to the positive power input lines of a row of magnetic switches and connects ground voltage to the negative power input lines of a column of magnetic switches. Only one magnetic switch is connected to both positive voltage and ground and thus only one magnetic switch will be electrically energized at a time; and that switch's position is defined by the particular row and column to which the switch belongs. The controller can electrically energize any one particular position along the network by addressing it's particular row and column.

The controller circuitry typically includes a pulse generator, an eight bit hexadecimal counter, signal conditioning for the sensor array output line, and digital logic gates for resetting the counter and activating the power multiplexer. The data output line is connected to the pulse generator through a simple logic gate that is part of the controller circuit. In simple operation, pulses are generated continuously and by default are considered control pulses. Pulses are treated as data pulses after a predetermined number of control pulses have been generated and counted, at which time the power multiplexer is activated and addressed with the row and column of the first position and the data output line begins transmitting data pulses. As each additional data pulse is generated the position address is advanced by one position until a switch is electrically energized that lies within a magnetic field of sufficient strength, at which time the common sensor array output switches from a high state to a low state, causing the controller logic circuits to deactivate the power multiplexer, reset the counter and return to generating control pulses. Thus the number of data pulses that is transmitted in any one string is directly proportional to the position of the magnetic field, and therefore to the position of the object being monitored.

The present invention is developed in the particular embodiment described above because it has two distinct advantages over more obvious embodiments and over the prior art; the proximity switches can be electronically connected as a matrix, thus substantially reducing the number of connections and logic gates that are necessary if a large number of switches are used and one and only one proximity switch is electrically energized at any instant in time, thus substantially reducing the amount of energy that would normally be consumed if a large number of switches are used.

It is important to note that each proximity switch represents a specific position along the intended path of the object and, in turn, each position that is resolved must be represented by a switch. Thus the number of positions that can be resolved is directly equal to the number of switches in the sensor array network. Even a moderate resolution of 2% requires 50 switches to be used in a single sensor array.

The prior art would suggest that common power connections be made between all the proximity switches, that the power be continuously applied to all switches and that each output be separately monitored to determine the location of the magnetic field.

Considering for example, a sensor array of moderate resolution that consists of 64 magnetic proximity switches each of which has three connections, two for power and one output and each of which consumes 15 milliamperes of current at 5 volts dc; since a one connection output does not fit the criteria for a matrix, the prior art would require 64 logic gates just to monitor the outputs of each switch and would consume 960 mA of current or roughly 5 watts of power. The power consumption alone would make it completely useless in the kind of remote locations for which the present invention is developed. Even in industrial applications where power is not a supply problem, the typical transmitter consumes less than 50 mA of current and support devices such as data acquisition systems, supply wiring and communications equipment would have to be modified to handle this level of current. For the same resolution and with the same 64 magnetic switches, the present invention would require only 16 logic gates arranged in an 8×8 matrix, and would consume only 15 mA of current or 75 milliwatts of power; this is one-fourth the number of gates, 1/64 the amount of power and a substantial improvement over the prior art.

SUMMARY OF THE INVENTION

The main object of this invention is to provide means to transmit a signal that is proportional to the position of a physical exciter that moves within the interior of a closed vessel while said means is located exterior to the vessel and further while said means in no way directly communicates with the vessel or with the object.

A further object of the present invention is to provide means to transmit a signal that is proportional to the position of a physical exciter that moves within the interior of a closed vessel while said means requires only three connections; a positive electrical power supply connection, an electrical ground connection, and an output signal connection.

Another object of the present invention is to provide means to transmit a signal that is proportional to the position of a physical exciter that moves within the interior of a closed vessel while said signal consists of only two states, a high state and a low state.

Another object of this invention is to provide means to transmit a signal that is proportional to the position of a physical exciter that moves within the interior of a closed vessel while said signal continues to be accurate and precise for an indefinite amount of time, and over a wide range of physical and operating conditions. The accuracy and precision of the present invention is inherently independent of large variations in temperature, pressure, atmosphere, and supply voltage.

Another object of the present invention is to provide means to transmit a signal that is proportional to the position of a physical exciter that moves within the interior of a closed vessel while said signal continues to be accurate and precise without benefit of recalibration if said means is removed from a first closed vessel and installed at a second vessel. The physical properties of the magnetic field and the vessel may vary considerably from the first vessel to the second vessel without significantly altering the accuracy and precision of the signal. The most significant physical property is the overall length that said physical exciter travels, which is synonymous with the size or range of said means.

Another object of the present invention is to provide means to monitor the output state of a plurality of digital proximity switches while the total power consumption of said means and of said plurality of switches is less than the power consumption of any one of these said switches.

Another object of the present invention is to provide means to monitor the output state of each of a plurality of digital proximity switches while the output lines of all of the switches are connected into a single output line.

Another object of the present invention is to provide means to position a plurality of digital proximity switches at precise intervals parallel to the intended path of a moveable physical exciter such that each individual switch represents a precise position along the path of said magnetic field.

Another object of the present invention is to provide means to electrically connect a plurality of digital proximity switches such that the output state of each individual switch can be singularly monitored in order to determine whether a physical exciter is acting on said individual switch and causing said switch to exist in it's physically active output state.

Another object of this invention is to provide means to electrically connect a plurality of digital proximity switches which are positioned at precise intervals parallel to the intended path of a moveable physical exciter such that each individual switch represents a precise position along the path of said exciter and such that the output state of each individual switch can be singularly monitored in order to determine whether an exciter is acting on said individual switch and causing said switch to exist in it's physically active output state in order to determine the precise position of the exciter.

A further object comprises the novel and useful provision, formation, construction, association and relative arrangements of parts, members, and features, all as depicted in a certain embodiment in the accompanying drawings, described generally, and more particularly pointed out in the claims.

Other objects of this invention will appear as the description thereof proceeds.

The disclosure of the present invention described herein represents the preferred embodiments of the invention; however, variations thereof, in the form, construction, and arrangement of the various components thereof and the modified application of the invention are possible without departing from the spirit and scope of the claims.

DESCRIPTION OF THE DRAWINGS

FIG. 8 is a functional block diagram of a position transmitter for transmitting data as a hexadecimal based digital number in use with a digital controller;

FIG. 9 is a functional block diagram of a position transmitter with four connections for transmitting data as a proportional analog signal in use with an analog controller;

FIG. 10 is a side view of a physicoelectric proximity sensor array arranged as a spiral around the outside of a cylinder;

FIG. 11 is a cross-sectional view of a physicoelectric proximity sensor array arranged as a spiral around the outside of a cylinder and applied as a differential pressure transmitter;

FIG. 12 is a cross-sectional view of a physicoelectric proximity sensor array arranged as an evenly-spaced line inside a straight tube and applied as a liquid level transmitter; and FIG. 13 is a cross-sectional view of a physicoelectric proximity sensor array arranged as an logarithmically-spaced line inside a straight tube and applied as a liquid level transmitter.

DESCRIPTION OF THE PREFERRED EMBODIMENT

Figure 1A:
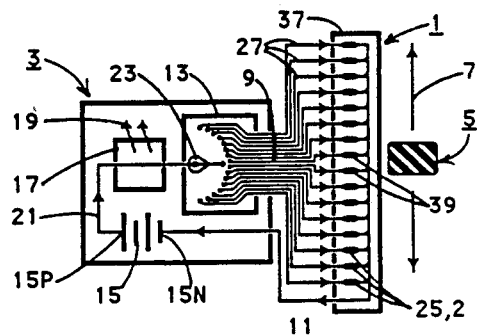
FIG. 1A is a schematic diagram of a low resolution physicoelectric proximity sensor array comprising proximity switches with two connections, in use with a manually operated controller and physically excited by a magnet.

Referring now to the drawings wherein like elements are identified with like numerals throughout the thirteen figures, FIG. 1A shows a schematic diagram of a physicoelectric proximity sensor array (herein after "PEPS array") 1 including a plurality of physicoelectric proximity sensors (herein after PEPS) 2, for use with an electrically powered external controller 3 in determining the position of a physical exciter 5 as it moves along an intended path as designated by dotted arrows (herein after "path") 7.

A schematic diagram of an electric circuit is one using simple symbols for the various parts and the interconnecting wires. Throughout the thirteen figures solid lines interconnecting the various parts represent electric conductors, including wires and conductive materials such as metal strips on printed-wiring boards and silicon based conductors in integrated circuits. The solid lines conduct electricity as electric power and as electric signals and will be described as outputs, inputs, lines, and conductors. The arrows on the solid lines show the general direction of electric current flow. When solid lines that cross or come together are electrically connected a little black dot is used to show the connection. Wavy arrows represent signals that are not electric and dotted arrows represent intended paths of objects. Further, the words current, voltage, impedance, resistance, switch, circuits and power refer to electrical characteristics and objects unless otherwise designated.

Controller 3 is electrically connected to PEPS array 1 at sixteen row outputs 9 and a column output 11 and is a manually operated controller requiring a human operator (not shown) and using human arm movements (not shown) as address signals (not shown) to direct a row driver 13 in applying power from a positive pole 15P of a battery 15 to one of row outputs 9 at a time. Power from a negative pole 15N of battery 15 is applied continuously to column output 11. Controller 3 uses a converter 17 to generate an address active signal designated by wavy arrows (herein after address active signal) 19.

Row driver 13 is shown as a manually operated selector switch such as a commercially available single pole, sixteen position rotary switch, also called a "one-of sixteen" switch.

Converter 17 includes a variety of circuits that convert a status current flowing in conductor 21 into a form that is recognized by human senses as an indication that the status current exceeds an imaginary reference current that is a characteristic value of the particular circuit. For example, converter 17 includes an electric lamp, a light emitting diode and resistor, a piezoelectric buzzer, a milliammeter, a voltmeter with a voltage divider network and drop resistor, a voltage comparator with voltage divider and light emitting diode and a voltage divider network with digital logic gate and light emitting diode.

Controller 3 is said to be "addressing the fifth row" when power is applied at the fifth row output. Power is applied at the fifth of row outputs 9 when a row knob 23 is moved to the fifth position. The position of row knob 23 displays to a human operator the "address" that is electrically energized.

Exciter 5 is the target object and includes objects composed of a variety of materials in a variety of forms adapted to physically excite PEPS array 1. The particular exciter 5 dictates the characteristics of PEPS array 1 and includes magnets, electromagnets, induction coils, pole pieces, gear tooth pieces, capacitive plates, eddy current plates, heated filaments, and light emitting diodes. The selection criteria for PEPS array 1 as it relates to exciter 5 will be discussed below.

Note that controller 3 and exciter 5 are not part of PEPS array 1 but are described in detail in order to show the type of simple circuits and common objects that will function effectively with PEPS array 1 and to simplify the discussion of how PEPS array 1 operates. Controller 3 includes more complex automatic controllers of known type which will be described later. Discussing the operation of PEPS array 1 in terms of use with more complex controllers would detract from the discussion.

PEPS array 1 includes a plurality of PEPS 2. In the preferred embodiment of the invention PEPS 2 includes circuits that are adapted to change their electrical properties according to their proximity to an appropriate type of physical exciter 5. More specifically PEPS 2 includes devices that conduct an active status current when power is applied to a device that is in close proximity to exciter 5 and do not conduct an active status current when power is applied to a device that is not in close proximity to exciter 5.

PEPS 2 may include many commercially available devices with different electrical connections, different types and flows of status current, different electrical energizing characteristics, and different physical excitation characteristics. Descriptions of specific devices for PEPS 2 are necessary to illustrate the invention and should not unnecessarily limit the invention. Further descriptions of PEPS 2 will generally be divided into three types of PEPS 2 that are differentiated according to the number of electrical connections and the subsequent characteristics of the status current. Each of the three types of PEPS 2 is designated with three different numerals and the designation "PEPS 2" is used only in general descriptions.

Thus the electrical connections and status current of a two connection type physicoelectric proximity sensors (herein after "2PEPS") 25 are differentiated from other PEPS 2 that have three connections (herein after "3PEPS") and four connections (herein after "4PEPS") and that generally have self-contained integrated circuits for signal and power conditioning. These other types of PEPS 2 are discussed with respect to other figures.

PEPS array 1 comprises sixteen separate 2PEPS 25 each of which is electrically connected to a different one of sixteen row lines 27 and to one common column line 29.

Figure 1B:
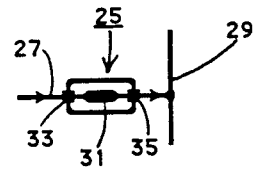
FIG. 1B is an enlarged section of the physicoelectric proximity sensor array of FIG. 1A showing how each two-connection proximity switch is connected in the array.

Referring now to FIG. 1B, a section of PEPS array 1 is enlarged to show how each of 2PEPS 25 is electrically connected and how a status current flows. 2PEPS 25 includes a physicoelectric circuit 31 with a row connection 33 at one end and a column connection 35 at the other. For each 2PEPS 25 row connection 33 is connected to one of row lines 27 and column connection 35 is connected to column line 29. The status current of each 2PEPS 25 is defined as current flowing through row connection 33, physicoelectric circuit 31, and column connection 35. The designation of the direction of the status current and of the connections as either a row or a column connection is for illustration purposes and often is purely arbitrary. In practice, row connection 33 and column connection 35 are often electrically equivalent and do not require electrical power of a specific polarity. In fact 2PEPS 25 of FIG. 1B can often be powered with either direct or alternating current, depending on the specific nature of 2PEPS 25.

Referring now generally to the descriptions in all thirteen figures of the preferred embodiment of the invention the word "address" is used in two specific ways. First, the word "address" is used as a noun and is defined as "a label which designates a location". Specifically the label is an integer "r" or a set of integers "(r,c)" that designates the location or position within PEPS array 1. Second, the word "address" is used as a transitive verb and is defined as "to direct the energy or force of (to)". Specifically controller 3 addresses one of PEPS 2 in PEPS array 1 by directing electrical power to that particular PEPS 2, thereby electrically energizing it. These two ways of using the word "address" are interrelated.

Referring now to FIG. 1A recall that in using controller 3 a status current is defined as active when its value exceeds an imaginary reference current that is a characteristic value of converter 17. For example if converter 17 consists of a light emitting diode that emits enough visible light for a human to recognize as a signal when it conducts a current that exceeds 10 milliamperes then 10 milliamperes is the value of the reference current and when a status current exceeds 10 milliamperes then it is considered an active status current.

2PEPS 25 are commercially available as devices that operate as individual switches or sensors and that function with all of the different types of exciter 5 described above. The most popular models of 2PEPS 25 are adapted with circuits that are physically excited when exciter 5 is an optical, capacitance, and magnetic device. For example, if exciter 5 is a magnet then 2PEPS 25 includes but is not limited to magnetoelectric proximity sensors that operate like a switch as characterized by common reed switches or like an analog sensor as characterized by magneto-resistive elements. If exciter 5 is a metal plate then 2PEPS 25 includes but is not limited to capacitive proximity sensors that operates like an analog sensor as characterized by capacitive conducting surfaces. If exciter 5 is a light emitting diode then 2PEPS 25 includes but is not limited to optoelectric detector that operate like an analog sensor as characterized by phototransistors, photodiodes, and selenium cells.

Referring to FIG. 1A, two examples will help explain how electrically energizing, physically exciting and achieving an active state are interrelated and how different types of 2PEPS 25 can be used in the operation of PEPS array 1.

In the first example 2PEPS 25 is a reed switch and exciter 5 is a magnet. If exciter 5 has not moved within sufficient proximity to physically excite 2PEPS 25 then it will be open, its impedance will be high, and no appreciable status current will flow through it when it is electrically energized, that is 2PEPS 25 will not achieve an active state. If exciter 5 has moved within sufficient proximity of 2PEPS 25 then it will close, its impedance will decrease sharply and a status current that greatly exceeds a reference current will flow through it when it is electrically energized, that is it will achieve an active state.

In the second example 2PEPS 25 is a magneto-resistive element and exciter 5 is a magnet. If exciter 5 has moved relatively far from 2PEPS 25 then its impedance will be high and no appreciable status current will flow through it when it is electrically energized, that is 2PEPS 25 will not achieve an active state. As exciter 5 moves closer to 2PEPS 25 its impedance will gradually decrease and a status current flowing through it when it is electrically energized will gradually increase. As long as the status current is less than a reference current then 2PEPS 25 is not physically excited and will not achieve an active state if electrically energized. At some point as exciter 5 continues to move closer to 2PEPS 25 its impedance will be low enough, it will be physically excited, and a status current that exceeds the reference current and is an active status current will flow through 2PEPS 25 when it is electrically energized, that is 2PEPS 25 will achieve an active state.

Referring still to FIG. 1A, exciter 5 moves along path 7 and PEPS array 1 includes support means 37 adapted to fixedly support each 2PEPS 25 in a spaced relationship along path 7 close enough to exciter 5 such that exciter 5 physically excites only a nearest 2PEPSI 39. The fact that FIG. 1A is a schematic diagram distorts the actual distance between PEPS array 1 and exciter 5 but serves to illustrate the relationship between the orientation of PEPS array 1 and exciter 5 moving along path 7. More realistic distances are shown in later figures. Note that the description refers to a "spaced relationship". One of the advantages of the invention is that PEPS array 1 can be fixedly supported in an almost unlimited number of different spaced relationships. This fact and its advantages are described with respect to later figures. The important points are that exciter 5 moves along path 7 as part of whatever process is being monitored, exciter 5 is capable of physically exciting only nearest 2PEPS 39, and as exciter 5 moves to different positions it physically excites different 2PEPS 25.

Support means 37 includes structures and materials adapted not to interfere with the ability of exciter 5 to physically excite each 2PEPS 25. The selection of appropriate structures and materials for support means 37 depends on the type and size of exciter 5, the corresponding type and sensitivity of 2PEPS 25, and the type of process monitored. Selection criteria for different types, sizes and sensitivities is well documented by the various manufacturers.

Support means 37 does not interfere with the ability of exciter 5 to physically excite 2PEPS 25 and includes but is not limited to structures constructed of materials as generally characterized by epoxy, glass, ceramics, silicon based substrates, and other solid state substrate materials and specifically characterized by stainless steel, aluminum, brass, composite materials, and paper for a magnetic exciter and an inductive exciter and by plastic and fiberglass for a capacitive exciter.

Support means 37 is not limited to any particular shape, style, or size by the nature of the invention itself. Support means 37 includes, but is not limited to, square tubing, round tubing, pipe, flat stock, electrical conduit, boxes, printed circuit board, tape, formed epoxy, printed circuit boards, and integrated circuit packages. In practice a combination of elements is preferred; for example if 2PEPS 25 are magnetoelectric proximity sensors and exciter 5 is a magnet then support means 37 includes a printed circuit board for supporting the plurality of 2PEPS 25, the circuit board mounted on aluminum flat stock secured inside aluminum conduit.

There are similarities between the elements and operation of PEPS array 1 and those of a common character keyboard. A character keyboard may use keys with sensors similar to 2PEPS 25 each associated with its own exciter similar to exciter 5. In the operation of the keyboard, power is applied to one key at a time and when a key is pressed its sensor becomes physically excited. An active status is indicated when the pressed key is electrically energized. Controller 3, as simple as it is, can control both PEPS array 1 and the keyboard. Using controller 3 the keyboard determines which key has been pressed and therefore which character is to be displayed while PEPS array 1 determine which 2PEPS 25 is nearest to exciter 5 and therefore which position is to be displayed. Both systems use the combination 2PEPS 25, exciter 5 and controller 3 as a two condition Boolean logic AND device with addressed power as one condition and physical excitation as the other condition. The difference between the systems is in how many of each part is used in the combination, how the parts are arranged in the combination and how the combination is used.

The reason the similarities between PEPS array 1 and a character keyboard are discussed is to explain why controller 3 is not included in the invention and why the different types of 2PEPS 25 are not each exhaustively discussed. There are many controllers on the market today performing the operations of controller 3 for use with keyboards, memory, process control, and instrumentation. These controllers are available with a variety of power levels, switching devices and signal monitors in packages ranging from large relay-driven models to sophisticated integrated circuits. In fact, most of the available controllers have more features and operations than required by PEPS array 1. Controller 3 as described in FIG. 1A is a simple version so as not to distract from the discussion of the operation of PEPS array 1.

In the operation of PEPS array 1 each 2PEPS 25 is addressed in turn; row driver 13 is switched to a position by turning row knob 23, applying power from battery 15 to one of row outputs 9, electrically energizing one of 2PEPS 25. If the addressed 2PEPS 25 is not nearest 2PEPS 39 then the addressed 2PEPS 25 is not physically excited, the status current flowing through converter 17 and addressed 2PEPS 25 does not exceed the reference current, converter 17 does not emit an address active signal 19, and row driver 13 is switched to the next position. If the addressed 2PEPS 25 is nearest 2PEPS 39 then the addressed 2PEPS 25 is physically excited, the status current flowing through converter 17 and addressed 2PEPS 25 exceeds the reference current and is an active status current, converter 17 emits an address active signal 19, the position of row knob 23 corresponds to the address of nearest 2PEPS 39, and the position of row knob 23 displays the position of exciter 5 along path 7.

Figure 2A:
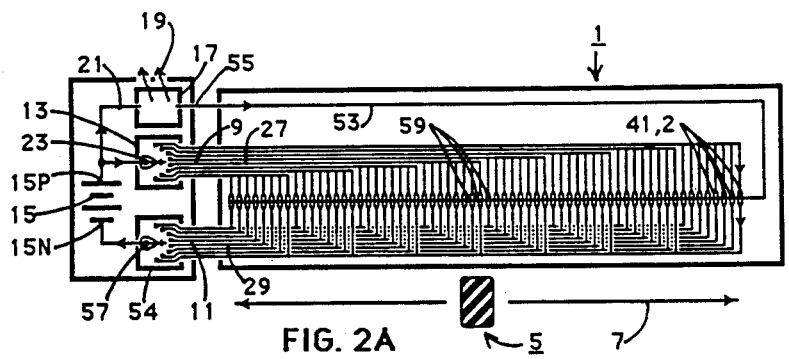
FIG. 2A is a schematic diagram of a medium resolution physicoelectric proximity sensor array comprising proximity switches with three connections, in use with a manually operated controller and physically excited by a magnet.

FIG. 2A shows a schematic diagram according to the preferred embodiment of the invention wherein many of the elements and functions are similar to those shown in the previous figure with the notable exception that PEPS array 1 comprises sixty-four separate three connection type physicoelectric proximity sensors (hereinafter "3PEPS") each one designated by the numeral 41, and each of which is electrically connected to one of eight row lines 27 and to one of eight column lines 29. There are eight 3PEPS 41 connected to each of the eight row lines 27 and eight 3PEPS 41 connected to each of the eight column lines 29. The effective operation of the invention requires that when power is applied to one of row lines 27 and one of column lines 29 only one of 3PEPS 41 is electrically energized.

3PEPS 41 includes electric devices with physicoelectric circuits that are adapted to change their electrical properties according to their proximity to an appropriate type of physical exciter 5. More specifically 3PEPS 41 includes devices that conduct an active status current when electrically energized while in close proximity to exciter 5 and do not conduct an active status current when electrically energized while not in close proximity to exciter 5. 3PEPS 41 is analogous to 2PEPS 25 in the previous figure except that 3PEPS 41 has three connections instead of two.

Figure 2B:
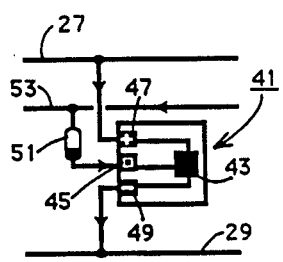
FIG. 2B is an enlarged section of the physicoelectric proximity sensor array of FIG. 2A showing how each three-connection proximity switch is connected in the array.

Referring now to FIG. 2B a section of PEPS array 1 is enlarged to show how each 3PEPS 41 is electrically connected and how a status current flows. 3PEPS 41 comprises a physicoelectric circuit 43 as an integrated circuit including power regulator, physicoelectric element, and signal conditioners (not shown), a sensor output 45, a positive power connection 47; and a negative power connection 49. A signal diode 51 connects sensor outputs 45 from each 3PEPS 41 to a PEPS array output 53 that is common to all 3PEPS 41. Signal diode 51 includes a such common diodes as the "1N4148" and decreases the amount of noise and crosstalk that would otherwise develop within the PEPS array 1. Positive power connection 47 is connected to one of row lines 27 and negative power connection 49 is connected to one of column lines 29.

The status current of each 3PEPS 41 is defined as current flowing through sensor output 45, physicoelectric circuit 43, and negative power connection 49. The designation of the direction of status current and of it flowing through negative power connection 49 instead of positive power connection 47 is arbitrary and only for illustration purposes as is explained later. The important point is that status current flows through sensor output 45.

In practice 3PEPS 41 usually includes circuits adapted to operate with power of a specific polarity so the drawing shows positive power connection 47 and negative power connection 49. This designation of polarity is for illustration purposes only and does not limit 3PEPS 41 to circuits that operate with direct current. In fact, 3PEPS 41 adapted for use with exciter 5 as an inductive type exciter are often operated with alternating current power.

There is a wide variety of commercially available 3PEPS 41 with a wide variety of power requirements, types and sensitivity of physical excitation, operating principles, packages, and types of output signals. 3PEPS 41 in the commercial world is referred to as a proximity sensor and a proximity switch. The most popular models of 3PEPS 41 are adapted with circuits that are physically excited when exciter 5 is an optical, capacitance, and magnetic device. 3PEPS 41 includes but is not limited to circuits adapted with proximity sensors as described for 2PEPS 25 in the previous figure and further including Hall Effect elements, eddy current sensors and inductive coils as the primary measurement device. 3PEPS 41 have been commercially adapted to provide any of the popular signal outputs including analog voltage, analog milliampere, digital current sinking and digital current sourcing.

It is important to note that the invention has been adapted to all types of commercially available PEPS, although certain types of PEPS are more easily adapted in the invention. Also, magnetic types of PEPS have been investigated and developed most thoroughly and are used most often as examples. The PEPS that are less suitable for use in the invention generally include PEPS that lack a true zero speed sensing and are designated as passive sensors. Generally the outputs of the less suitable sensing devices are dependent on the speed of the exciter.

Although the invention does not restrict the selection of PEPS to a particular type, it does require compatibility between the type of PEPS that is selected and the remaining elements of the circuit. It is not difficult for someone practiced in the arts to adapt the circuits of the invention to be compatible with most proximity switch or position sensor. More details concerning the circuits adapted for the preferred embodiment of the invention will be discussed below.

For example in referring still to FIG. 2B, 3PEPS 41 includes a magneto-resistor based magnetic proximity switch such as a "Model SS22PE" manufactured by Honeywell, Microswitch. The SS22PE is selected primarily because of its high sensitivity and low power consumption. The SS22PE incorporates a voltage regulator, magnetoresistive element, voltage divider network, voltage comparator, and common collector transistor within physicoelectric circuit 43. The SS22PE has a current sinking output which means that if it is not magnetically excited then sensor output connection 45 acts like a high impedance barrier and if it is magnetically excited then sensor output connection 45 will sink a current of about 20 mA to negative power connection 49. Thus the remaining elements in the circuit must be designed for compatibility with the "active low", current sinking character of the SS22PE. Compatibility also applies to the relationship between controller 3 and PEPS array 1. Controller 3 includes the same elements as in the previous figure except that they are arranged differently to be compatable with the fact that 3PEPS 25 includes sensor output connection 45. Controller 3 is a manually operated controller requiring a human operator (not shown) and using human arm movements (not shown) as address signals (not shown) to direct row driver 13 in applying power from positive pole 15P of battery 15 to one of eight row outputs 9 at a time and a column driver 54 in applying power from negative pole 15N of battery 15 to one of eight column outputs 11 at a time. Controller 3 uses converter 17 to generate address active signal 19. Converter 17 is connected on one end to positive pole 15P and on the other end to a status input 55.

Row driver 13 and column driver 54 are shown as a manually operated selector switch such as a commercially available single pole, eight position rotary switch, also called a "one-of-eight" switch.

Recall that converter 17 includes a variety of circuits that convert a status current flowing in conductor 21 into a form that is recognized by human senses as an indication that the status current exceeds an imaginary reference current that is a characteristic value of the particular circuit.

Controller 3 is said to be "addressing position '(r,c)'" where "r" and "c" are integers from "0" to "7", when power is applied at the "rth" of row outputs 9 and at the "cth" of column outputs 11. Power is applied at the "rth" of row outputs 9 and at the "cth" of column outputs 11 when row knob 23 is moved to the "rth" position and a column knob 57 is moved to the "cth" position. The combination of the positions of row knob 23 and column knob 57 displays to a human operator the "address '(r,c)'" that is electrically energized.

Controller 3 is electrically connected to PEPS array 1 and includes each of row outputs 9 connected to one of row lines 27, each of column outputs 11 connected to one of column lines 29, and status input 55 connected to PEPS array output 53.

As a further example of compatibility and how easily elements can be shifted around to accomplish compatibility, if 3PEPS 41 in FIG. 2A had a current sourcing output then PEPS array output 53 would be connected through converter 17 to negative pole 15N and diode 51 would be reversed. Or, if 3PEPS 41 had an analog output signal then converter 17 would include a voltage comparator circuit connected to PEPS array output 53.

The combined position of row knob 23 and column knob 57 determines which 3PEPS 41 is electrically energized, that is which 3MEPS 41 is connected to battery 15. The position of row knob 23, expressed as the integer "r" and the position of column knob 57, expressed as the integer "c", are combined to function as the address "(r,c)" and thus to designate a unique physical location within PEPS array 1.

Exciter 5 is the target object, moves along path 7, and comprises like elements and like functions as in FIG. 1A and therefore is not discussed in detail. As in the previous figure the fact that FIG. 2A is a functional schematic diagram distorts the actual distance between PEPS array 1 and exciter 5. The important points are that exciter 5 moves along path 7 as part of whatever process is being monitored, exciter 5 is capable of physically exciting only nearest 3PEPS 59, and as exciter 5 moves to different positions it physically excites different 3PEPS 41.

In the operation of PEPS array 1 each 3PEPS 41 is addressed in turn, from the first to the sixty-fourth, electrically energized one at a time by switching row driver 13 and column driver 54 through a sequence of addresses "(r,c)" by turning row knob 23 and column knob 57. If the addressed 3PEPS 41 is not nearest 3PEPS 59 then the addressed 3PEPS 41 is not physically excited, the status current flowing through converter 17 does not exceed the reference current, converter 17 does not emit an address active signal 19, and the next 3PEPS 41 is addressed. If the addressed 3PEPS 41 is nearest 3PEPS 59 then the addressed 3PEPS 41 is physically excited, the status current flowing through converter 17 exceeds the reference current and is an active status current, converter 17 emits an address active signal 19, the position "(r,c)" of row knob 23 and column knob 57 corresponds to the address "(r,c)" of nearest 3PEPS 59 and displays the position of exciter 5 along path 7.

The fact that PEPS array 1 can be addressed as a matrix has a distinct advantage over other arrangements. The advantage is that the number of row lines 27 is significantly reduced; instead of one of row lines 27 directing power to one of 3PEPS 41, one of row lines 27 can direct power to four, eight, sixteen or more of 3MEPS 41, depending on the size of the matrix configuration of PEPS array 1. In the same way the number of column lines 29 is significantly reduced. This advantage increases as the number of 3PEPS 41 in PEPS array 1 increases. In turn controller 3 can be simplified; the number of positions and outputs is significantly reduced. For example, row driver 13 requires a separate position for each of row outputs 9 and each of row lines 27, which have a one-to-one correspondence. If the number of row outputs 9 is reduced then the number of positions required is reduced. This advantage is particularly significant when solid state switches are substituted for manual switches as illustrated in succeeding embodiments.

The fact that in the operation of the invention one and only one of 3PEPS 41 is addressed at any time is a significant advantage in terms of total power consumption. In order for the invention to have a resolution that is practical, PEPS array 1 typically includes sixty-four 3PEPS 41. Consider that a typical 2PEPS 41, to electrically energize it may consume a current of ten milliamperes. If all sixty-four MEPS 63 are consuming electrical power at the same time the total current required would exceed six hundred milliamperes. For an industrial measurement sensor six hundred milliamperes of power consumption is unacceptable. However in the operation of the invention as described, with one and only one 3PEPS 41 addressed at any one time the power consumption is reduced to ten milliamperes-a significant reduction. In fact the invention consumes no more power than and can consume less power than a single 3PEPS 41 consumes.

Note that the address "(r,c)", as used above, is an electrical or logical designation only and does not necessarily specify the real physical location of the designated 3PEPS 41. To explain further, the address "(r,c)" represents an electrical location that is by definition the intersection of one of row lines 9 and one of column lines 11. These lines are wires that can be any practical length and are generally very flexible so that physically the particular 3PEPS 41 could be located anywhere. The implication is that "the fifth" 3PEPS 41 does not necessarily have to be physically located next to "the sixth" 3PEPS 41 or of more interest, that the distance between the fifth 3PEPS 41 and the sixth 3PEPS 41 does not have to be equal to the distance between the sixth 3PEPS 41 and the seventh 3PEPS 41. A further implication is that PEPS array 1 is not necessarily constructed as a straight line, equally spaced array; that is it is not necessarily linear. This attribute allows a great deal of versatility in the area of applications design and will be discussed in later figures.

Note that the discussion above, concerning the advantages of the matrix, the one and only one operation, and the non-linear applications are not limited to PEPS array 1 comprising 3PEPS 41 and applys equally to all types of PEPS array 1.

Figure 3A:
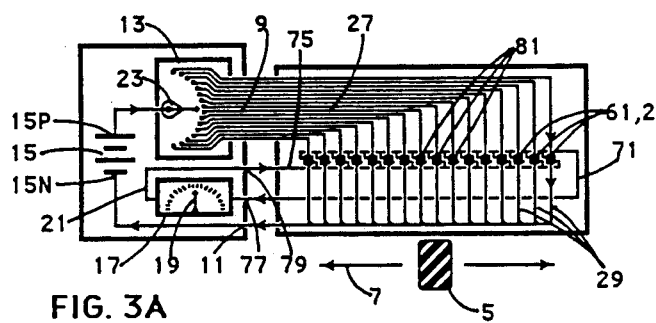
FIG. 3A is a schematic diagram of a physicoelectric proximity sensor array comprising analog proximity sensors with four connections, in use with a manually operated controller and physically excited by a magnet.

FIG. 3A shows a schematic diagram according to the preferred embodiment of the invention wherein many of the elements and functions are similar to the previous figures with the notable exception that PEPS array 1 comprises sixteen separate four connection type physicoelectric proximity sensors (herein after "4PEPS") each one designated by the numeral 61, and each of which is electrically connected to a different one of sixteen row lines 27 and to column line 29. The effective operation of the invention requires that when power is applied to one of row lines 27 and column line 29 only one of 4PEPS 61 is electrically energized.

4PEPS 61 includes electric devices with physicoelectric circuits that are adapted to change their electrical properties according to their proximity to an appropriate type of physical exciter 5. More specifically 4PEPS 61 includes devices that conduct an active status current when electrically energized while in close proximity to exciter 5 and do not conduct an active status current when electrically energized while not in close proximity to exciter 5. 4PEPS 61 is analogous to 2PEPS 25 and 3PEPS 41 from the previous figures except 4PEPS 61 has four connections instead of two or three. FIG. 3A is included to illustrate how PEPS array 1 is adapted to PEPS with different numbers of connections.

Figure 3B:
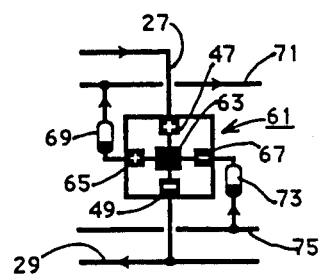
FIG. 3B is an enlarged section of the physicoelectric proximity sensor array of FIG. 3A showing how each four-connection proximity sensor is connected in the array.

Referring now to FIG. 3B a section of PEPS array 1 is enlarged to show how each 4PEPS 61 is electrically connected and how a status current flows. 4PEPS 61 comprises a physicoelectric circuit 63 as an integrated circuit including power regulator, physicoelectric element, and signal conditioners (not shown), a positive sensor output 65, a negative sensor output 67, positive power connection 47; and negative power connection 49. A signal diode 69 connects positive sensor outputs 65 from each 4PEPS 61 to a positive PEPS array output 71 that is common to all 4PEPS 61. A signal diode 73 connects negative sensor outputs 67 from each 4PEPS 61 to a negative PEPS array output 75 that is common to all 4PEPS 61. Signal diodes 69 and 73 include such common diodes as the "1N4148" and decrease the amount of noise and crosstalk that would otherwise develop within the PEPS array 1. Signal diodes 69, 73 are not always necessary, especially if physicoelectric circuit 63 includes diodes. Positive power connection 47 is connected to one of row lines 27 and negative power connection 49 is connected to column line 29.

The status current of each 4PEPS 61 is defined as current flowing through negative sensor output 67, physicoelectric circuit 63, and positive sensor output 65.

The designation of the direction of status current is arbitrary and only for illustration purposes.

In practice 4PEPS 61 usually includes circuits adapted to operate with power of a specific polarity so the drawing shows positive power connection 47 and negative power connection 49. This designation of polarity is for illustration purposes only and does not limit 4PEPS 61 to circuits that operate with direct current. In fact, 4PEPS 61 adapted for use with exciter 5 as an inductive type exciter are often operated with alternating current power.

There is a wide variety of commercially available 4PEPS 61 with a wide variety of power requirements, types and sensitivity of physical excitation, operating principles, packages, and types of output signals. 4PEPS 61 in the commercial world is generally referred to as a proximity sensor. The most popular models of 4PEPS 61 are adapted with circuits that are physically excited when exciter 5 is an optical, capacitance, and magnetic device. 4PEPS 61 includes but is not limited to circuits adapted with proximity sensors as described for 2PEPS 25 and 3PEPS 41 from the previous figures as the primary measurement device. 4PEPS 61 have been commercially adapted to provide the popular analog signal outputs including voltage and milliampere. 4PEPS 61 generally do not include digital outputs.

As noted in the previous figures the invention has been adapted to all types of commercially available PEPS currently known by the inventor, although certain types of PEPS are more easily adapted in the invention. Also, magnetic types of PEPS have been investigated and developed most thoroughly and used most often as examples. The invention does require compatibility between the type of PEPS that is selected and the remaining elements of the circuit.

For example in referring still to FIG. 3B, 4MEPS 61 includes a magneto-resistor based magnetic field sensor such as a "Model KMZ10C" manufactured by Sprague Industries. The KMZ10C incorporates magneto-resistive elements in a Wheatstone bridge electrical arrangement within physicoelectric circuit 63. The KMZ10C has a millivolt output which varies in value depending on the strength and orientation of a magnetic field. The value of the millivolt output adds to or substracts from an offset voltage. The remaining elements in the circuit must be designed for compatibility with the analog millivolt character of the KMZ10C.

Compatability also applies to the relationship between controller 3 and PEPS array 1. Controller 3 includes the same basic elements as in the previous figures except they are arranged differently to be compatible with the facts that 4PEPS 61 includes positive sensor output 65 negative sensor output 67 and that converter 17 is a millivolt meter. Controller 3 is a manually operated controller requiring a human operator (not shown) and using human arm movements (not shown) as address signals (not shown) to direct row driver 13 in applying power from positive pole 15P of battery 15 to one of sixteen row outputs 9 at a time. Power from negative pole 15N of battery 15 is applied continuously to column output 11. Row driver 13 is shown as a manually operated selector switch such as a commercially available single pole, sixteen position rotary switch, also called a "one-of-sixteen" switch. Row knob 23 is used to direct row driver 13.

Recall that converter 17 includes a variety of circuits that convert a status current flowing in conductor 21 into a form that is recognized by human senses as an indication that the status current exceeds a predetermined reference current. Controller 3 uses converter 17 to generate address active signal 19 shown as a deflection of the millivolt meter needle. Converter 17 is connected to positive status input 77 and to negative status input 79.

Controller 3 is said to be "addressing the fifth row" when power is applied at the fifth of row outputs 9. Power is applied at the fifth of row outputs 9 when row knob 23 is moved to the fifth position. The position of row knob 23 displays to a human operator the "address" that is electrically energized.

Controller 3 is electrically connected to PEPS array 1 and includes each of row outputs 9 connected to one of row lines 27, column output 11 connected to column line 29, positive status input 77 connected to positive PEPS array output 71 and negative status input 79 connected to negative PEPS array output 75.

The position of row knob 23 determines which 4MEPS 61 is electrically energized, that is which 4MEPS 61 is connected to battery 15. The position of row knob 23 functions as the address and designates a unique physical location within PEPS array 1.

Exciter 5 is the target object, moves along path 7, and comprises like elements and like functions as in the previous figures and is not further discussed in detail. As in the previous figures the fact that FIG. 3A is a schematic diagram distorts the actual distance between PEPS array 1 and exciter 5. The important points are that exciter 5 moves along path 7 as part of whatever process is being monitored, exciter 5 is capable of physically exciting only a nearest 4MEPS 81, and as exciter 5 moves to different positions it physically excites different 4MEPS 61.

In the operation of PEPS array 1 each 4MEPS 61 is addressed in turn, from the first to the sixteenth, electrically energized one at a time by switching row driver 13 through a sequence of address by turning row knob 23. If the addressed 4PEPS 61 is not nearest 4PEPS 81 then the addressed 4PEPS 61 is not physically excited, the status current flowing through converter 17 does not exceed the reference current, converter 17 does not indicate an address active signal 19, and the next 4PEPS 61 is addressed. If the addressed 4PEPS 61 is nearest 4PEPS 81 then the addressed 4PEPS 61 is physically excited, the status current flowing through converter 17 exceeds the reference current and is an active status current, converter 17 indicates an address active signal 19, the position of row knob 23 corresponds to the address of nearest 4PEPS 81 and displays the position of exciter 5 along path 7.

Figure 4:
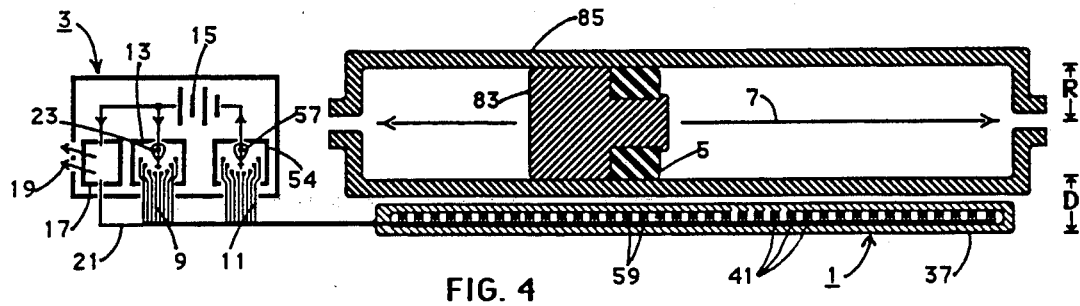
FIG. 4 shows a physicoelectric proximity sensor array in use with a manually operated controller and applied to determining the fullness of a contant pressure sample cylinder used in the process of continuous fluid sampling.

Referring now to FIG. 4, PEPS array 1 is used to determine the degree of fullness of a constant pressure sample cylinder used in the petrochemical industrial process of continuous fluid sampling. A piston 83 is enclosed within a cylinder 85. Exciter 5 is a magnet 5 that is securely fixed to piston 83 and both travel along path 7 as the process of sampling continues. Piston 83, cylinder 85 and magnet 5 are not part of the preferred embodiment of the invention but help to illustrate three advantages of the invention, which is developed to determine the position of magnet 5. FIG. 4 also illustrates a more realistic distance between exciter 5 and PEPS array 1.

PEPS array 1 are shown as comprising 3PEPS 41 as magnetoelectric proximity switches as described in a previous figure. Note that PEPS array 1 comprising 2PEPS 25 and 4PEPS 61 also apply. PEPS array 1 is connected to controller 3 as a manually operated controller as in the previous figure and operates as in the previous figure. PEPS array 1 and controller 3 are shown but not described in great detail so as not to be repetitious.

The first advantage is that the object whose position is to be determined, in this case magnet 5 can be completely isolated from PEPS array 1 and can be contained within a hostile environment such as a pressure vessel or a hazardous atmosphere.

The second advantage is that the outside edge of magnet 5 and thus of piston 83 can be located relatively far from PEPS array 1. The maximum distance "D" between the edge of magnet 5 and PEPS array 1 is approximately equal to the radius "R" of magnet 5. Nearest 3PEPS 59 are the only 3PEPS 41 that are physically excited by exciter 5.

The third advantage is portability. Assuming that PEPS array 1 is stationary, cylinder 85 can be removed and replaced with a new sample cylinder. This is an important advantage of the invention, especially as it relates to continuous fluid sampling; an integral part of the sampling cycle is to be able to remove cylinder 85 when it is full and bring it to a laboratory for analysis of the sampled fluid. In processes other than sampling the reverse circumstance may be equally advantageous; PEPS array 1 could be easily moved from one location to the next.

Note that piston 83 and cylinder 85 are, in practice, much more complex than shown and that magnet 5 is already installed in most constant pressure sample cylinders as part of their current flag type position indicator. The simple drawing is used in order not to overly complicate the description of the invention. There are many different manufacturers of constant pressure sample cylinders with many different designs. The invention was developed to work with most of them with little or no modifications.

Piston 83, cylinder 85, and support means 37 must be constructed of materials that do not interfere with the magnetic field of magnet 5, characterized by metals such as stainless steel, aluminum and brass, and by non-metallic materials such as plastic, wood, composite material, epoxy, paper and glass.

Support means 37 is not limited to any particular shape, style, or size by the nature of the invention itself. Recall that PEPS array 1 is outside the hostile enviorment and therefore has no special "housing" requirements. Support means 37 includes shapes and materials as described in the previous figures. In practice, for an industrial grade product, a combination of elements is preferred; mounting PEPS array 1 on aluminum flat stock secured inside aluminum conduit that is secured to an aluminum electric box.

Figure 5:
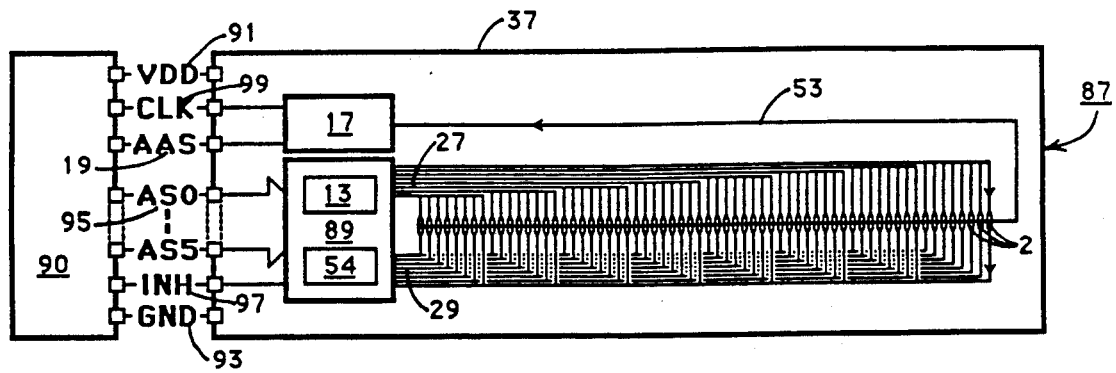
FIG. 5 is a functional block diagram of an electrical digital position transmitter referred to as a multipepser in use with a digital controller and addressed with hexadecimal code.

Referring now to FIG. 5, a functional block diagram illustrates the preferred embodiment of a functional block which is herein after referred to as a multipepser 87. Multipepser 87 is a electrical digitally operated version of the preferred embodiments of the invention as described in the previous figures. Multipepser 87 includes PEPS array 1, converter 17, and a driver 89 supported by support means 37. Multipepser 87 is designated as a separate functional building-block in order to avoid unnecessary repetition when describing the preferred embodiments of the invention as illustrated in succeeding figures.

Note that multipepser 87 includes elements that were part of controller 3 in previous figures. Multipepser 87 is a more advanced version of PEPS array 1, with some control elements included directly in the circuit, with a lesser number of more generalized connections. This follows a typical development of an measurement instrument from a sensor to a transmitter. Multipepser 87 functions either as a building-block in more developed transmitters as illustrated in succeeding figures or as a sensor for use with an electrically powered digitally operated external controller 90.

As described in a previous figure solid lines interconnecting the various parts of schematic and block diagrams represent electrical conductors unless otherwise specified. Conductors will be designated by a capitalized abbreviation for the signal or power conducted and will be further designated by a numeral. Conductors conducting like signals will be designated by the same capitalized abbreviation and by the same numeral. A conductor will be introduced the first time as "a conductor . . . " and therein after referred to only by the capitalized abbreviation and numeral. This convention is used throughout the remaining figures.

Multipepser 87 receives the most positive voltage from controller 90 at a conductor VDD 91 and a ground potential voltage from controller 90 at a conductor GND 93. The internal connections and routing of VDD 91 and GND 93 are not shown in order to maintain the clarity of the diagram. Those skilled in the arts recognize this as convention and understand that electrical power must be supplied to all electrical elements. This convention is used throughout the remaining figures.

Throughout the remaining figures all signals and pulses are respectively digital electrical signals and digital electrical pulses, unless otherwise specified. A digital electrical signal can assume either of two electrical states. A "high" state has a voltage at or near the voltage of VDD 91 and is referred to as a Logic "1". A "low" state has a voltage at or near the voltage of GND 93 and is referred to as a Logic "0". A pulse is a specific type of signal that periodically alternates between a Logic "1" and a Logic "0".

PEPS array 1 comprises sixty-four 3PEPS 41, each of which is electrically connected to one of eight row lines 27 and to one of eight column lines 29. As in the preceding figures PEPS array 1 includes all the varieties of PEPS that have been discussed even though they are not shown including 2PEPS 25, 3PEPS 41, and 4PEPS 61, and in all cases multipepser 87 will include inputs, outputs, and operations as described below. And of course, as noted in previous figures, the remaining elements and interconnections must be compatible with the type of PEPS used in PEPS array 1. 3PEPS 41 is used in the preferred embodiment of the invention because of wide commercial availability.

Hereinafter the discussion will assume that each 3PEPS 41 comprises a SS22PE from Honeywell Microswitch. Specifying a particular type of sensor is not meant to limit the invention to that type of sensor but to illustrate the considerations for applying this and other sensors. The implications are that VDD 91 is +8 to +15 volts direct current (more about this below) and that a Logic "0" at PEPS array output 53 indicates that one of 3PEPS 41 is in an active state. This is conventionally referred to as an "active low".

Further, multipepser 87 receives a sequence of address signals from controller 90 at a plurality of conductors AS0-AS5 95, which are internally routed to driver 89 to direct it. The minimum number of conductors AS0-AS5 95, because of their binary nature, is dependent on the number of 3PEPS 41 in PEPS array 1 according to the formula "number of 3PEPS $41 = 2^n$", where "n" is the number of conductors AS0-AS5 95. For example, if PEPS array 1 includes sixty-four 3PEPS 41 then at least six conductors AS0-AS5 95 are required. Throughout the remaining figures it is assumed that multipepser 87 includes PEPS array 1 comprising sixty-four 3PEPS 41. This assumption is made to simplify the discussion and in no way limits the variety of multipepser 87.

Using the assumptions as stated above, there are six conductors AS0-AS5 95 receiving a sequence of address signals. Note that the sequence is not limited to any particular order by the operation of the invention. This is apparent from the fact that in the operation of the invention as described in previous figures the position of the exciter (not shown) is determined from the address "(r,c)" at the time converter 17 transmits an address active signal at a conductor AAS 19. It is not critical to the operation to know what the previous address "(r,c)" was or what the subsequent address will be. However, there is no apparent advantage in describing a random or otherwise unnatural sequence.

Therefore, in the discussion, the sequence of address signals will be limited to the series of six digit natural binary numbers from Logic "000000" (corresponding to decimal zero) to Logic "111111" (corresponding to decimal sixty-three). For example the first number in said series is Logic "000000" corresponding to address "(000,000)". The second number in said series is Logic "000001" (decimal one) corresponding to address "(000,001)". The thirty-sixth number in said series is Logic "100110" (decimal thirty-five) corresponding to address "(100,101)". Thus series of binary numbers is equivalent to a series of addresses "(r,c)" and both are equivalent to a sequence of switch control signals.

Multipepser 87 receives an inhibit signal from controller 90 at a conductor INH 97. INH 97 is connected to driver 89 and can inhibit its operation. A Logic "1" at INH 97 will inhibit the operation of driver 89. A Logic "0" at INH 97 will cause driver 89 to operate normally. The advantages of INH 97 will become apparent when the details of driver 89 are discussed below.

Driver 89 comprises two digital electrical selector switches; row driver 13 and column driver 54. The total number of switches required or the total number of driver channels required is equal to the number of row lines 27 plus the number of column lines 29. Driver 89 includes commercially available solid state multiplexers and sets of solid state switches characterized by two of the generic "4051" CMOS analog switches. The 4051 is characteristic because it has eight channels in a single 16 pin DIP package, an internal 3 input binary decoder, an internal inhibit control connection, and a low resistance between input and output, typically 120 ohms.

Row driver 13 is connected as follows: input/output connected to VDD 91; binary decoder to AS3-AS5 95; inhibit control to INH 97; and eight channels to row lines 27. Column driver 54 is connected as follows: input/output connected to GND 93; binary decoder to AS0-AS2 95; inhibit control to INH 97; and eight channels to column lines 29.

In the operation of the invention, when INH 97 receives a Logic "0" driver 89 is in a normal operational mode and address signals received at AS0-AS5 95 determine which one of row lines 27 is addressed and which one of column lines 29 is addressed. When INH 97 receives a Logic "1" driver 89 is in an inhibited mode and none of row lines 27 are addressed and none of column lines 29 are addressed; driver 89 is essentially shut down.

INH 97 can be used effectively in two ways. The first way is as a clocked logic control to shut down multipepser 87 while controller 90 performs housekeeping activities. The second way is as duty cycle control to shut down multipepser 87 for a part of any cycle in order to reduce electrical power consumption. Note that by controlling the duty cycle at 50% the operation of multipepser 87 with sixty-four of 3PEPS 41 consumes about one-half the electrical power that a single 3PEPS 41 consumes. If the function of INH 97 is not required or desired it is simply connected to GND 93. This maintains INH 97 at a Logic "0" and driver 89 in normal mode.

Multipepser 87 receives a clock signal as a stream of constant frequency digital pulses from controller 90 at a conductor CLK 99 in order to synchronize the operation of converter 17. CLK 99 is connected to converter 17. Further, multipepser 87 transmits an address active signal to controller 90 at AAS 19 that indicates that 3PEPS 41 is both physically excited and electrically energized and therefore in an active state, conducting an active status current. AAS 19 is connected to converter 17 which is connected to PEPS array output 53. If a clock signal at CLK 99 is not required or desired CLK 99 is simply connected to VDD 91. This maintains CLK 99 at a Logic "1" and converter 17 in an opened gate mode.

Converter 17 comprises gated signal conditioning circuitry characterized by 2-input logic gates, gated Schmitt Triggers, flip-flops, transmission gates, inverters, and combinations thereof in conjunction with pull-up resistors and voltage divider networks. Logically, because of the "active low" characteristic of PEPS array output 53, a single 2-input "OR" gate with a pull-up resistor would be the simplest circuit. However the level of noise on PEPS array output 53 indicates the use of a Schmitt Trigger and Schmitt Triggers are not readily available in a "OR" configuration.

The fact is that PEPS array output 53 is quite noisy during transitions when driver 89 stops addressing one of 3PEPS 41 and starts to address the next one of 3PEPS 41. During these transitions the status current of PEPS array output 53 is invalid and these invalid states should not be transmitted via AAS 19 to controller 90.

While PEPS array output 53 may be noisy during these transition periods it is quite noise free between the transition periods and it is during this settled, noise free time that the "gate" of converter 17 is opened by an appropriate signal at CLK 99 and the digital state of PEPS array output 53 is transmitted via AAS 19 to controller 90.

One skilled in the arts could design a number of different circuits to fulfill the requirements of gated signal conditioning. A simple practical converter 17 is characterized by three-fourths (three gates) of a generic "4093" CMOS QUAD 2-input NAND Schmitt trigger and a 100 kilohm pull-up resistor. The pull-up resistor is connected between VDD 91 and PEPS array output 53 in order to maintain PEPS array output 53 in the normal Logic "1" state. The pull-up resistor is necessary because normally PEPS array output 53 acts like a high impedance dead end. The first Schmitt trigger is used as an inverter by connecting its inputs to PEPS array output 53 and to VDD 91. The second Schmitt trigger is used as a gate by connecting its inputs to the output of the first Schmitt trigger and to CLK 83. The third Schmitt trigger is used as an inverter by connecting its inputs to the output of the second Schmitt Trigger and to VDD 91. The output of the third Schmitt trigger is connected to AAS 19. The gate is open, allowing the state of PEPS array output 53 to pass to AAS 19, only when the signal at CLK 99 is Logic "1" (this assumes that transition occurs when the signal at CLK 99 transits from Logic "1" to Logic "0", i.e. transition is negative edge-triggered). The first and third Schmitt triggers are used as inverters so that AAS 19 has the characteristic of an "active high".

PEPS array output 53 is noisy and should be connected to gated signal conditioning circuitry for the best operation. The number of connections necessary to connect PEPS array 1 directly to an external controller is larger than the number of connections normally acceptable as a "transmitter". In the interest of universal application it is better to provide a clean digital signal at AAS 19 that can be recognized by most external controllers and to construct a transmitter that has a reasonable number of connections that are addressed in a conventional way.

There are three reasons why CMOS devices are specified and they are listed in order of importance. The first reason is that CMOS will operate with VDD 91 between +3 and +15 volts. Many 3PEPS 41, including the SS22PE, require +5 volts or greater. There is a voltage drop across driver 89. Taking voltage drop into consideration VDD 91 should be about +8 volts, which would be too high for TTL and other devices that normally operate at +5 volts. The second reason is that CMOS devices are inherently less susceptible to noise and multipepser 87 is a noisy device. The third reason is that CMOS devices are more power efficient, especially if they are not switching states. Low power consumption is a general object of the invention. The major drawback to CMOS devices are their slower speed, which is not a major consideration in the invention. Switching rates in the millisecond range are perfectly acceptable.

In the operation of the invention multipepser 87 receives a series of six digit natural binary numbers at AS0–AS5 95 from controller 90. If INH 97 receives a Logic "0" from controller 90 then driver 89 addresses one of 3PEPS 41 in PEPS array 1 then the next. Each one of 3PEPS 41 is addressed until AAS 19 transmit a Logic "1" to controller 90. This indicates that one of 3PEPS 41 is both electrically energized and physically excited and that CLK 99 is receiving a Logic "1" (data valid) from controller 90. Further, when AAS 19 transmits a Logic "1" the six digit natural binary number being received at AS0–AS5 95 is equivalent to the position of the exciter (not shown).

It should be noted that controller 90 and hereinafter all "controllers" display the position data. Those skilled in the arts recognize that the word "display" is a broad term that includes but is not limited to meters moving pointers, dial positions, digits shown by light emitting diodes (LED) or liquid crystal displays (LCD), cathode ray tube (CRT) displays, and computer printouts. The method of displaying the data is not as important as the fact that the data is available for use by humans.

Multipepser 87 includes support means 37 as part of PEPS array 1 which was described in detail in previous figures. In multipepser 87 support means 37 additionally supports converter 17 and driver 89. In addition to previous descriptions it is worth adding that multipepser 87 could be manufactured as a single integrated circuit if the production volume warranted the development costs and capital expenditures necessary. In such a case support means 37 also includes silicon based substrates, ceramics, and other solid state substrate materials.

The functional block designated multipepser 87 is included in all succeeding preferred embodiments of the invention. Multipepser 87 will no longer be described in detail in succeeding figures and will hereinafter be treated as a functional block.

Figure 6:
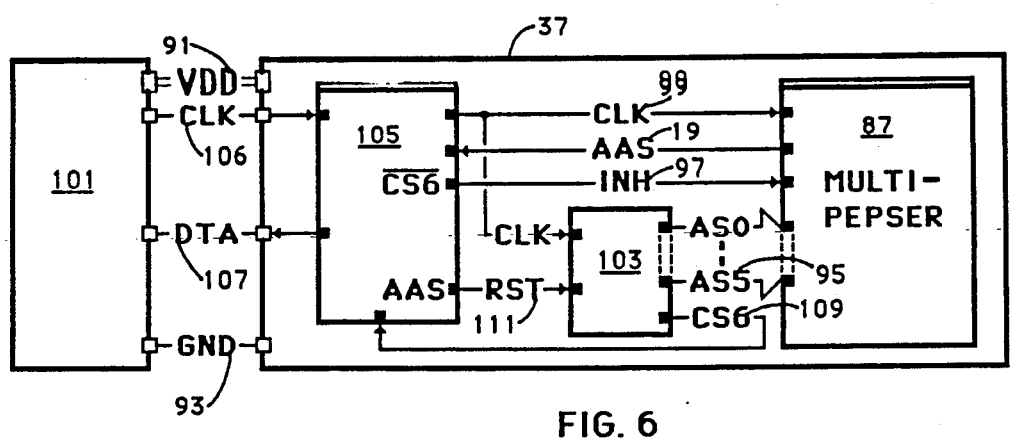
FIG. 6 is a functional block diagram of an electrical digital position transmitter with four connections including a data output connection for transmitting data as string of digital pulses in use with a digital controller.

Referring now to FIG. 6 a functional block diagram according to the preferred embodiment of the invention for use with a controller 101, includes multipepser 87, a counter 103, and a processor 105, in determining the position of an exciter (not shown) attached to an object (not shown) moving along an intended path (not shown).

Controller 101 includes electrically powered digitally operated controllers of known type that supply electric power at VDD 91 and GND 93, transmit a controller clock signal at a conductor CLK 106, receive a data signal as a string of data pulses followed by at least one missing pulse at a conductor DTA 107, and displays the number of data pulses in the string (not shown).

Support means 37 supports multipepser 87, counter 103 and processor 105. Support means 37 includes elements according to the preferred embodiment of the invention as described in previous figures, specifically integrated circuit substrates.

The combination multipepser 87, counter 103, and processor 105 receives the most positive voltage from controller 101 at VDD 91 and a ground potential voltage from controller 101 at GND 93.

Processor 105 receives a controller clock signal as stream of constant frequency digital pulses from controller 101 at CLK 106, an address active signal from multipepser 87 at AAS 19, and a control signal from counter 103 at a conductor CS6 109. Processor 105 transmits an inhibit control signal to multipepser 87 at INH 97, a reset control signal to counter 103 at a conductor RST 111, and a data output signal to controller 101 at DTA 107. Processor 105 takes over many of the functions performed by the external controller in previous figures. This is done principally to reduce the number and complexity of connections to an external controller as per typical transmitter development. Reducing the number of connections usually reduces installation costs and simplifies external controller requirements.

Processor 105 comprises clocked logic control circuitry characterized by 2-input logic gates, inverters, transmission gates and combinations thereof. In terms of Boolean logic, processor 105 in a simple form includes a conductor, an inverter and a 2-input "AND" gate (not shown).

Processor 105 includes a conductor (not shown) that receives an address active signal at AAS 19 and directs the address active signal as a reset control signal to counter 103 at RST 111. AAS 19 is conducted through processor 105 according to convention and to show that more complex versions of processor 105 may include some processing of AAS 19 especially clocking. Recall that AAS 19 from multipepser 87, as described in previous figures, normally conducts an "inactive" Logic "0" and conducts an address active signal as a Logic "1". RST 111, as described below, conducts a Logic "0" for normal operation of counter 103 and conducts a Logic "1" to reset counter 103. Thus AAS 19 and RST 111 are directly compatible; in the operation of the invention counter 103 is reset when AAS 19 conducts an address active signal. The label "AAS" is shown inside processor 105 adjacent to RST 111 in order to show that RST 111 is equivalent to AAS 19.

Processor 105 includes an inverter (not shown) that receives a control signal from counter 103 at CS6 109, inverts the control signal, and transmits the inverted signal as an inhibit control signal at INH 77 to multipepser 87. The control signal at CS6 109 represents a more significant bit than the largest significant bit that is transmitted as an address signal at AS5 95. CS6 109 as shown is weighted "64" which is more significant that AS5 95 which is weighted "32". This is explained further in the description of counter 103. Note, as an example, that if multipepser 87 comprises one hundred and twenty-eight PEPS in PEPS array (not shown) instead of sixty-four then seven conductors at "AS0–AS6" would transmitted address signals and CS7 would transmitted the control signal.

A control signal at CS6 109, when inverted, is used as an effective inhibit control signal by allowing counter 103 to receive sixty-three processor clock signal pulses at CLK 99 before multipepser 87 operates normally. Also a control signal at CS6 109, by remaining at the same logic state while counter 103 transmits a predetermined sequence of address signals at AS0–AS5 95. Recall that multipepser 87 is inhibited when INH 97 conducts a Logic "1" and operates normally when INH 97 conducts a Logic "0" whereas CS6 109 conducts a Logic "0" for the first sixty-three processor clock signal pulses and conducts a Logic "1" for the second sixty-three processor clock signal pulses. A simple inversion makes the signals compatible. The label "CS6" is shown inside processor 105 adjacent to INH 97 in order to show that an inverted CS6 109 is equivalent to INH 97. The implications of using the outputs of counter 103 for an inhibit control signal are discussed further in the description of the operation of the invention below.

Processor 105 includes a 2-input "AND" gate (not shown) that receives a control signal from counter 103 at CS6 109 and a controller clock signal at CLK 106 and transmits the resulting data output signal from DTA 107. The logic involved in this operation is simple but effective; processor 105 will transmit the pulses of a controller clock signal as a data output signal from DTA 107 only when CS6 109 conducts a Logic "1" which is to say only when multipepser 87 is operating normally (see above). This will be discussed further below.

To one skilled in the arts, processor 105 is a rather simple logic control circuit and can be constructed from a wide variety of commercially available elements. Processor 105 is characterized by a generic "4011" CMOS Quad 2-input NAND Gate. One of the four "NAND" gates is configured as an inverter by connecting one of its inputs to VDD 91. Two other "NAND" gates are configured as a single "AND" gate by using the first gate as a 2-input "NAND" and inverting the output with the second. The substitution of a "4011" for two inverters and an "AND" gate is fundamental to one skilled in the arts and has the advantage that the requirements of processor 105 are met with a single 14-pin DIP package.

Multipepser 87 receives a processor clock signal as stream of constant frequency digital pulses from processor 105 at CLK 99, a predetermined sequence of address signals from counter 103 at AS0-AS5 95, and an inhibit control signal from processor 105 at INH 97. Further, multipepser 87 transmits an address active signal to processor 105 from AAS 19. Multipepser 87 includes elements and interconnections and operates according to the preferred embodiment of the invention as described in a previous figure.

Counter 103 receives a processor clock signal as a stream of constant frequency digital pulses from processor 105 at CLK 99 and a reset control signal from processor 105 at RST 111. Counter 103 transmits a control signal to processor 105 at CS6 109, and a predetermined sequence of address signals to multipepser 87 at AS0-AS5 95.

Counter 103 includes a variety of counters, flip-flops, other clocked logic circuits generally defined as sequential-state machines, and combinations thereof with their respective control circuits. There are many such devices, with many different characteristics that are commerically available. It is difficult to specify the characteristics of counter 103 without limiting the scope of the invention unnecessarily. The particular device and its characteristics is not as important as the fact that is must be compatible with multipepser 87. In order to limit the selection criteria, multipepser 87 is assumed to have characteristics as described below and such characteristics are considered desireable but not necessary.

Counter 103 includes characteristics of a total modulo of at least sixty-four, straight binary coding, resettability, symmetry, decade cascadability, negative-edge clocking, and weighting of "1", "2", "4", "8", "16", "32", and "64". Characteristics of counters that are not as important are synchronous vs. ripple, presettability, decodability, and count direction.

More specifically, counter 103 includes the generic "4520" CMOS dual, synchronous, hexadecimal counter. The "4520" is actually two counters with a total modulo of two hundred and fifty-six. The "4520" is operated in the negative-edge clocking mode by grounding the "CL" inputs and triggering at the "EN" inputs. The "4520" is cascaded by triggering the second counter with the weighted "8" output of the first counter. The negative-edge triggering eliminates the need for additional control gates but also eliminates the "4520"'s synchronicity (which is not as important). Common precautions about bounce-free trigger signals with fast rise times must be observed. With the "4520" set up in this way counter 103 comes in a single 16-pin DIP package and there is one output (weighted "128") left unused.

In the operation of the preferred embodiment of the invention the data output signal transmitted at DTA 107 of processor 105 includes a string of constant frequency pulses followed by at least one missing pulse. In practice the data output signal transmitted from DTA 107 of processor 105 as specifically described above includes a string of constant frequency pulses followed by at sixty-three missing pulses. Controller 101 uses what is generally referred to as a missing pulse detector (not shown) to determine if there is a missing pulse. Missing pulse detectors operate in three basic ways that will be described in general only.

In the first way, the string of constant frequency pulses transmitted from DTA 107 is compared by controller 101 with a controller clock signal at CLK 106. That is, for controller 101 if a pulse is transmitted at CLK 106 and there is not a corresponding pulse received at DTA 107 then there is a missing pulse. A digital comparator is an example of this type of missing pulse detector.

In the second way, the data output signal is a string of constant frequency pulses transmitted from DTA 107 and is compared with an idealized stream of continuous digital pulses "constructed" from the actual data output signal transmitted from DTA 107. That is, the missing pulse detector of controller 101 generates a stream of pulses that matches the data output signal transmitted from DTA 107 in phase and frequency and uses this for comparison. Phase locked loops are examples of this type of missing pulse detector.

In the third way, the data output signal is a string of constant frequency pulses transmitted from DTA 107 that continually resets a triggering device that is in a continuous state of decay. If a pulse is not received in time to reset the triggering device then the triggering device will decay past a set point and the missing pulse detector will change logic states. Timing circuits with resistive-capacitance support elements are examples of this type of missing pulse detector.

These brief descriptions are included now to facilitate an understanding of the operation of the preferred embodiment of the invention as described in this figure and not as an exhaustive ananlysis of missing pulse detectors. In the operation of the invention the particular choice of methods for detecting the missing pulse is not important. The missing pulse is actually at least sixty-three missing pulses which is easily detected by the crudest missing pulse detector. The large number of missing pulses is achieved by the use of a more significant bit than address signals at AS5 95 as a control signal at CS6 109 to inhibit the operation of multipepser 87 and to gate the data output signal of processor 105 at DTA 107.

In the operation of the invention, when counter 103 is reset CS6 109 conducts a Logic "0" and remains a Logic "0" until sixty-three processor clock signal pulses are received by counter 103 at CLK 99. During such time INH 97 remains a Logic "1" thus inhibiting the operation of multipepser 87. Further during such time DTA 107 conducts a Logic "0" (no pulse) thus causing controller 101 to detect a missing pulse.

In the operation of the invention when counter 103 has received sixty-four processor clock signal pulses (after reset) at CLK 99 CS6 109 transits to a Logic "1" and remains a Logic "1" until either sixty-four more pulses are received or counter 103 is reset. During such time INH 97 remains a Logic "0" thus allowing multipepser 87 to operate normally. Further during such time DTA 107 transmits a data output signal as a string of contant frequency pulses. Further when multipepser addresses a PEPS that is physically excited AAS 19 transits to a Logic "1", counter 103 is reset, CS6 109 transits to a Logic "0", DTA 107 stops transmitting pulses, controller 101 detects the missing pulse and the number of pulses in the string of pulses that constitute the data output signal is proportional to the position of the exciter (not shown) and is diplayed by controller 101.

Considering the process another way, the position of the exciter (not shown) is proportional to the number of clock signal pulses that are transmitted to counter 103 from the time RST 111 transits to a Logic "0" to the time AAS 19 transits to a Logic "1" that is how many of the sequence of address signals were sent before AAS 19 indicates an active address. While this process may seem cumbersome, in practice it is straightforward.

The operation of the preferred embodiment of the invention as described can be generally referred to as a "Reset Process" and thus can be differentiated from what is referred to as a "Latch Process" which is discussed in later figures. The Reset Process works best when the PEPS of multipepser 87 are closely spaced within PEPS array. This insures that at least one PEPS will always be physically excited active. If there are no physically excited PEPS then the number of pulses will be greater than the number of address signals in the predetermined sequence, for example greater than sixty-four. However this is not an insurmountable problem and by no means limits the use of the Reset Process to a closely spaced PEPS array.

It is for this reason that the statement is made that the number of pulses in the data output signal is proportional (not equal) to the position of the exciter. Assuming a dynamic process is being monitored, the exciter will eventually excite a PEPS and the pulses will stop. By recognizing that in the operation of the invention the address signals at AS0–AS5 95 will be repeated for every sixty-four pulses of processor clock signal at CLK 99, then the total number of pulses can be divided by sixty-four and the remainder is equal to the position of the exciter.

For example if the total number of pulses is three hundred and fifty-two then this equals five cycles of sixty-four with a remainder of thirty-two. Thirty-two becomes the number that is equal to the position of the exciter. In practice this is much easier than it sounds. If controller 101 is set to the same modulo as counter 103 then the remainder is computed automatically.

It is important to note that according to the preferred embodiment of the invention conductors CLK 106 and DTA 107 are not necessarily electrical conductors conducting electrical signals. Controller 101, processor 105, and conductors CLK 106 and DTA 107 can be adapted with circuits to transmit, receive and conduct the appropriate signals as almost any type of pulses including pulses of electricity, light, pressure, and radio waves. There are a large number of commercially available converters of known type for converting electrical pulsed signals to pulses of light, pressure, and radio waves and conductors of known type for conducting pulsed signals of light and pressure. One of the fastest growing technologies today is transmission of signals of light over fiber optics and this can be applied to the invention. There are likewise many older industrial technologies still in use today that utilize pressure and radio waves to transmit pulsed signals. These technologies with their attending circuits are well developed and well documented and thus will not be exhaustively described here.

The point is that the inventions is developed in order to take advantage of these technologies primarily because of the advantages of using pulsed signals other than electrical. The simplicity of the data output signal, that is a string of pulses, adapts particularly well to such variations. Recall that one of the advantages of the invention is that it can determine the position of objects and exciters that must be isolated in hostile environments or remote locations. The ability to transmit the signals via non-electrical methods becomes an additional complementary advantage.

An example is environments containing explosive atmospheres. Light signals would not contain enough energy to detonate such atmospheres and would be safer. Remote locations may benefit by transmitting signals as radio waves via satellites as is commonly done in the oil and gas industry.

Note that electrical power must still be supplied to the invention as described in this figure which represents some disadvantages. Overcoming this shortcoming is the purpose of the preferred embodiment of the invention as described in the next figure.

Figure 7:
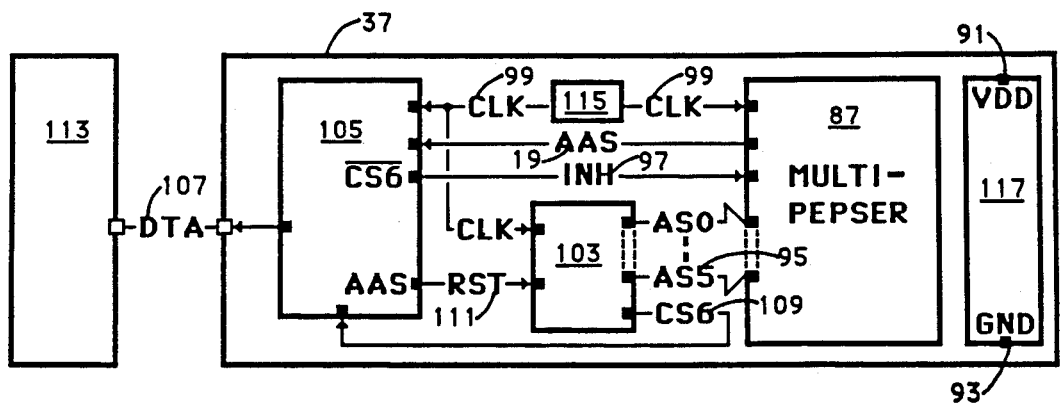
FIG. 7 is a functional block diagram of a battery powered digital position transmitter with a single connection for transmitting data as a string of digital pulses in use with a digital controller.

Referring now to FIG. 7 a functional block diagram according to the preferred embodiment of the invention for use with a controller 113, includes multipepser 87, counter 103, processor 105, a clock signal generator 115, and a self-contained power supply 117, in determining the position of an exciter (not shown) attached to an object (not shown) moving along an intended path (not shown). Many of the elements, interconnections and operations are the same as described in the previous figure, the primary differences being that clock signal generator 115 generates a clock signal and electrical power is supplied by power supply 117. Note that both clock signal generator 115, and power supply 117 are added to the embodiment of the previous figure but that there are advantages to adding either one alone. Both elements are added to this figure in order to avoid unnecessary repitition.

Controller 113 includes electrically powered digitally operated controllers of known type that receive a data signal as a string of data pulses followed by at least one missing pulse at conductor DTA 107, and displays the number of data pulses in the string (not shown).

Support means 37 supports multipepser 87, counter 103, processor 105, clock signal generator 115, and power supply 117. Support means 37 includes elements according to the preferred embodiment of the invention as described in previous figures.

The combination multipepser 87, counter 103, processor 105, and clock signal generator 115 receives the most positive voltage from power supply 117 at VDD 91 and the most negative voltage from power supply 117 at a conductor GND 93. Power supply 117 is a self-contained electrical power source of known type.

Power supply 117 includes but is not limited to batteries, solar cells, electrical generators and combinations thereof that are commercially available and well developed and that typically provide a low voltage direct electrical current. Power supply 117 includes elements, circuits and interconnections that will not be discussed in great detail because of their ready commercial availability.

Clock signal generator 115 generates and transmits a stream of relatively constant frequency digital pulses as a clock signal to multipepser 87, processor 105 and counter 103 at CLK 99. Clock signal generator 115 includes but is not limited to a variety of building-block timing devices with supporting circuitry that includes resistor-capacitor combinations, crystals, and resistor-inductance combinations. Timing circuits for generating a clock signal are well studied and well documented and thus will not be described in great detail.

Clock signal generator 115 includes practically any astable circuit from the simplest inverter, resistor, capacitor combination, to integrated timing circuits such as the common "555" to sophisticated crystal driven circuits. The accuracy, precision, and stability requirements of clock signal generator 115 are not critical.

Recall that a data signal at DTA 107 will have, for example, sixty-three missing pulses in the operation of the invention. The large number of missing pulses means that the timing of any one pulse is not that critical.

In practice, clock signal generator 115 includes any of the integrated timing circuits characterized by the "555" with a supporting resistor-capacitor network. The network is chosen to provide an approximately symmetrical pulse at about one hundred per second, which is relatively slow.

Processor 105 receives a clock signal as a stream of constant frequency digital pulses from clock signal generator 115 at CLK 99, an address active signal from multipepser 87 at AAS 19, and a control signal from counter 103 at a conductor CS6 109. Processor 105 transmits an inhibit control signal to multipepser 87 at INH 97, a reset control signal to counter 103 at a conductor RST 111, and a data signal to controller 113 at DTA 107. Processor 105 comprises elements and interconnections as described in the previous figure.

Multipepser 87 receives a clock signal from clock signal generator 115 at CLK 99, a predetermined sequence of address signals from counter 103 at AS0–AS5 95, and an inhibit control signal from processor 105 at INH 97. Further, multipepser 87 transmits an address active signal to processor 105 from AAS 19. Multipepser 87 includes elements and interconnections and operates according to the preferred embodiment of the invention as described in a previous figure.

Counter 103 receives a clock signal from clock signal generator 115 at CLK 99 and a reset control signal from processor 105 at RST 111. Counter 103 transmits a control signal to processor 105 at CS6 109, and a predetermined sequence of address signals to multipepser 87 at AS0–AS5 95. Counter 103 includes elements and interconnections and operates according to the preferred embodiment of the invention as described in a previous figure.

The operation of the preferred embodiment of the invention as described above is the same as the operation described in the previous figure. The data signal transmitted at DTA 107 of processor 105 includes a string of pulses followed by at least one missing pulse. Controller 113 uses a missing pulse detector (not shown) as described in previous figures to determine if there is a missing pulse. The particular choice of methods for detecting the missing pulse is not important. The missing pulses are achieved by the use of a more significant bit than address signals at AS5 95 as a control signal at CS6 109 to inhibit the operation of multipepser 87 and to gate the data signal of processor 105 at DTA 107.

As described in the previous figure according to the preferred embodiment of the invention conductor DTA 107 is not limited to electrical conductors conducting electrical signals. Controller 113, processor 105, and conductor DTA 107 can be adapted with circuits to transmit, receive and conduct the appropriate signals as almost any type of pulses including pulses of electricity, light, pressure, and radio waves.

The invention is developed in order to take advantage of these technologies primarily because of the advantages of using pulsed signals other than electrical. Because of the addition of the self-contained power supply and the simplicity of the data signal the invention can take full advantage of these technologies. The connections between controller 113 and the invention are reduced to a single non-electric connection and in the case of radio waves to no direct connection. This has particular advantages when dealing with hostile environments or remote locations. The advantages characterized by non-electric conductors are maintained even if the invention does not include clock signal generator 115, because a clock signal is also a pulsed signal readily adaptible to non-electric transmission.

Referring now to FIG. 8 a functional block diagram according to the preferred embodiment of the invention for use with a controller 119, includes multipepser 87, counter 103, clock signal generator 115, and a storage register 121, in determining the position of an exciter (not shown) attached to an object (not shown) moving along an intended path (not shown).

Controller 119 includes electrically powered digitally operated controllers of known type that supply electric power at VDD 91 and GND 93, receive a data signal as a stored address signal at a plurality of conductors SA0–SA5 123, and display the stored address signal (not shown).

Support means 37 supports multipepser 87, counter 103, clock signal generator 115, and storage register 121. Support means 37 includes elements according to the preferred embodiment of the invention as described in previous figures, specifically integrated circuit substrates.

The combination multipepser 87, counter 103, clock signal generator 115, and storage register 121 receives the most positive voltage from controller 119 at VDD 91 and a ground potential voltage from controller 119 at GND 93.

Clock signal generator 115 generates and transmits a clock signal as a stream of relatively constant frequency digital pulses to multipepser 87, and counter 103 at CLK 99. Clock signal generator 115 includes but is not limited to a variety of building-block timing devices as described in the previous figure. Timing circuits for generating a clock signal are well studied and well documented and thus will not be described in great detail.

Multipepser 87 receives a clock signal from clock signal generator 115 at CLK 99, and a predetermined sequence of address signals from counter 103 at AS0–AS5 95. An inhibit control signal at INH 97 is held at a Logic "0" by connecting INH 97 to GND 93, maintaining multipepser 87 in a normal operational mode. Further, multipepser 87 transmits an address active signal to storage register 121 at AAS 19. Multipepser 87 includes elements and interconnections and operates according to the preferred embodiment of the invention as described in previous figure.

Counter 103 receives a clock signal from clock signal generator 115 at CLK 99. A reset control signal at RST 111 is held at a Logic "0" by connecting RST 111 to GND 93, maintaining counter 103 in a normal operational mode. Counter 103 transmits a predetermined sequence of address signals to multipepser 87 and storage register 121 at AS0–AS5 95.

Counter 103 includes elements and interconnections and operates according to the preferred embodiment of the invention as described in previous figures. Counter 103 includes characteristics as described in previous figures except that resetability is not required although in some cases resetability may be desirable as discussed later.

Storage register 121 receives a storage control signal as an address active signal from multipepser 87 at AAS 19 and address signals from counter 103 at AS0–AS5 95.

Storage register 121 stores a single address signal from AS0–AS5 95 and continuosly transmits the stored address signal as a data signal to controller 119 at SA0–SA5 123.

Storage register 121 generally includes a plurality of latches, each latch adapted with a circuit with an input and an output for electrical digital information and an input for a control signal. The control signal makes the output either follow the input or be held in its present state. A plurality of latches used together with the same control signal to each is considered a storage register.

Storage register 121 includes but is not limited to circuits generally referred to as "D" flip flops, latches, storage registers, memory registers, and combinations thereof with their respective control circuits. There are many such circuits commercially available which differ primarily in their control circuits. In the practice of the invention an important consideration is to match the storage control signal of storage register 121 with the address active signal of multipepser 87. If their is a problem matching the control signals it can usually be solved by addition of an inverter or simple logic gate. It is also important to match the number of inputs of storage register 121 with the number of conductors in address signal at AS0–AS5 95.

Specifically, storage register 121 as described in the drawing includes a storage register with at least six inputs at AS0–AS5 95 and with the following control characteristics. The data signal at SA0–SA5 123 follows the address signal at AS0–AS5 95 when a Logic "1" storage control signal is conducted at AAS 19. The last address signal present at AS0–AS5 95 is stored internally when the storage control signal at AAS 19 transits from a Logic "1". And the stored address signal is continuously transmitted as a data signal at SA0–SA5 123 as long as the storage control signal at AAS 19 remains a Logic "0".

More specifically, storage register 121 as described in the drawing includes the generic "4508" CMOS dual, 4-bit latch. The "4508" is actually two latches with a total of eight inputs. The "4508" has a storage control circuit that operates according to characteristics described above. The "4508" follows when a storage control signal is a Logic "1" and stores and displays when a storage control signal is a Logic "0". In the operation of the preferred embodiment of the invention as described above clock signal generator 115 advances counter 103 causing it to address multipepser 87 with a predetermined sequence of address signals. Recall that addressing multipepser 87 as above causes it to electrically energize each PEPS (not shown) in turn and that only a few PEPS (not shown) are physically excited by their close proximity to exciter (not shown) and are referred to as nearest PEPS (not shown). When multipepser 87 electrically energizes nearest PEPS (not shown) a valid address active signal at AAS 19 transits from a Logic "0" to a Logic "1", remains as a Logic "1" while nearest PEPS is addressed, transits to a Logic "0" when nearest PEPS is no longer addressed, and remains a Logic "0" until nearest PEPS is addressed again. (Note that "valid" address active signal refers to the function of the clock signal in gating address active signal and is not included to avoid overcomplicating the description.) Thus a valid address active signal at AAS 19 functions as a storage control signal for storage register 121 causing it to internally store and transmits the address signal of nearest PEPS (not shown) as a data signal at SA0–SA5 123. Controller 119 then displays the address signal of nearest PEPS (not shown) thus displaying the position of the exciter (not shown) or object (not shown) connected to the exciter.

Those skilled in the art will recognize that the stored address signal at SA0–SA5 123 is equivalent to a binary coded number whose value is proportional to the position of the exciter (not shown) and is essentially a stored digital position number. Those skilled in the arts will further recognize that a stored digital position number is versatile and can be converted to any number of generally acceptable data signals including but not limited to direct character display, binary coded decimal, analog voltage, and analog current. These conversions can be accomplished by adding converters to the invention or by utilizing the invention with controller 119 that includes such converters. These converters are not described in detail because their elements and operations are well documented and their circuits are readily adapted to the invention.

The operation of the preferred embodiment of the invention as described can be generally referred to as a "Latch Process" and thus can be differentiated from what is referred to as a "Reset Process" which is discussed in earlier figures. The Latch Process works best when the PEPS (not shown) of multipepser 87 are not closely spaced within PEPS array (not shown). This insures that only one PEPS will always be physically excited and that only one address signal will be stored. Of course the Latch Process still works if the PEPS are closely spaced within PEPS array. It just means that several adjacent PEPS may be physically excited at the same time and that several successive address signals are stored and transmitted in quick succession. This will cause a small "bounce" in data signal at SA0–SA5 123 but is not a major problem.

For example, if three of sixty-four PEPS are physically excited then storage register 121 will transmit the address of the first nearest PEPS for one clock signal pulse, the address of second nearest PEPS for one clock signal pulse and the address of the third nearest PEPS for sixty-two clock signal pulses. Assuming that each clock signal pulse last about one hundredth of a second and that controller 119 displays the address signals as a visible display a human being would only see the address signal of the third nearest PEPS.

In practice this "bounce" problem is usually not significant but if it is undesirable in a particular application there are several reasonably simple solution to the problem. One solution is to apply an embodiment of the invention as described in previous figures as elements and operations of the Reset Process. Recall that the Reset Process is compatible with a closely space PEPS array.

Another general solution, utilizing the embodiment of the invention as described in this drawing, involves essentially interrupting the operation of the invention after the first address active signal is transmitted from multipepser 87 at AAS 19. The operation of the invention can be interrupted after the first address active signal is transmitted in a variety of ways including but not limited to resetting counter 103, disabling storage register 121, adding a gate to AAS 19 and disabling it, and inhibiting multipepser 87. With the exception of resetting counter 103 the interruption methods would be applied for a specific amount of time depending on the expected number of additional address active signals. For example if the exciter normally physically excites five PEPS at a time there would then normally be five address active signals and five follow/store operations in quick succession, thus the operation should be interrupted for a time equivalent to at least four successive address signals or approximately four clock signal pulses. This interruption process will be described in more detail in the next figure.

It is important to note that according to the preferred embodiment of the invention conductors SA0–SA5 123 are not necessarily electrical conductors conducting electrical signals. Controller 119, storage register 121, and conductors SA0–SA5 123 can be adapted with circuits to transmit, receive and conduct the appropriate signals as digital signals of light. There are a large number of commercially available converters of known type for converting electrical digital signals to digital light signal. As noted in earlier figures one of the fastest growing technologies today is transmission of signals of light over fiber optics and this can be applied to the invention.

The point is that the invention is developed in order to take advantage of these technologies primarily because of the inherently digital nature of the position determination.

Referring now to FIG. 9 a functional block diagram according to the preferred embodiment of the invention for use with a controller 125, includes multipepser 87, counter 103, clock signal generator 115, a digital-to-analog converter 127, and an interrupt timer 129, in determining the position of an exciter (not shown) attached to an object (not shown) moving along an intended path (not shown). Note that this drawing is included primarily to detail the elements and operations of interrupt timer 129 and is otherwise included in the description of the previous figure.

Controller 125 includes electrically powered controllers of known type for use with standard four wire transmitters that supply electric power at VDD 91 and GND 93, receive an analog data signal at a conductor +OUT 131 and at a conductor −OUT 133, and display or transmit the analog signal (not shown).

Support means 37 supports multipepser 87, counter 103, clock signal generator 115, digital-to-analog converter 127, and interrupt timer 129. Support means 37 includes elements according to the preferred embodiment of the invention as described in previous figures, specifically integrated circuit substrates.

The combination multipepser 87, counter 103, clock signal generator 115, digital-to-analog converter 127, and interrupt timer 129 receives the most positive voltage from controller 125 at VDD 91 and a ground potential voltage from controller 125 at GND 93.

Clock signal generator 115 generates and transmits a clock signal as a stream of relatively constant frequency digital pulses to multipepser 87, and counter 103 at CLK 99. Clock signal generator 115 includes but is not limited to a variety of building-block timing devices as described in the previous figures. Timing circuits for generating a clock signal are well studied and well documented and thus will not be described in great detail.

Multipepser 87 receives a clock signal from clock signal generator 115 at CLK 99, a predetermined sequence of address signals from counter 103 at AS0–AS5 95, and an inhibit control signal from interrupt timer 129 at INH 97. Further, multipepser 87 transmits an address active signal to digital-to-analog converter 127 and interrupt timer 129 at AAS 19. Multipepser 87 includes elements and interconnections and operates according to the preferred embodiment of the invention as described in a previous figure.

Counter 103 receives a clock signal from clock signal generator 115 at CLK 99. A reset control signal at RST 111 is held at a Logic "0" by connecting RST 111 to GND 93, maintaining counter 103 in a normal operational mode. Counter 103 transmits a predetermined sequence of address signals to multipepser 87 and digital-to-analog converter 127 at AS0–AS5 95.

Counter 103 includes elements and interconnections and operates according to the preferred embodiment of the invention as described in previous figures. Counter 103 includes characteristics as described in previous figures except that resettability is not required although in some cases resettability may be desirable as discussed later.

Digital-to-analog converter 127 receives a latch control signal as an address active signal from multipepser 87 at AAS 19 and address signals from counter 103 at AS0–AS5 95. Digital-to-analog converter 127 stores a single address signal from AS0–AS5 95, converts the stored address signal to its equivalent analog data signal, and transmits the analog data signal to controller 125 at +OUT 131 and −OUT 133.

Digital-to-analog converter 127 includes devices adapted with circuits to receive and store upon command a parallel multi-bit electrical binary coded signal, convert that signal to its equivalent analog data signal level as compared to a reference voltage and transmit that signal as a precise, stable electrical analog data signal. There are many such devices, with many different characteristics that are commercially available. It is difficult to specify the characteristics of digital-to-analog converter 127 without limiting the scope of the invention unnecessarily. The particular device and its characteristics is not as important as the fact that it must be compatible with multipepser 87, counter 103, and controller 125. In order to limit the selection criteria, multipepser 87 and counter 103 are assumed to have characteristics as above and in previous figures and such characteristics are considered desireable but not necessary.

Digital-to-analog converter 127 includes characteristics of six-bit binary or sixty-four decimal resolution, voltage or current output depending on controller 125, on-chip reference voltage, adjustable offset and gain, and low power consumption. Characteristics that are not as important are settling time, interface compatibility with microprocessors, double buffered inputs, and conversion method.

In the practice of the invention an important consideration is to match the latch control signal of digital-to-analog converter 127 with the address active signal of multipepser 87. If their is a problem matching the control signals it can usually be solved by addition of an inverter or simple logic gate. It is also important to match the number of inputs of storage register 121 with the number of conductors in address signal at AS0–AS5 95.

Specifically, digital-to-analog converter 127 as described in the drawing includes at least six inputs at AS0–AS5 95 and the following control characteristics. The analog data signal at +OUT 131 and −OUT 133 follows the converted equivalent of an address signal at AS0–AS5 95 when a Logic "1" latch control signal is conducted at AAS 19. The last address signal present at AS0–AS5 95 is stored internally when the latch control signal at AAS 19 transits from a Logic "1" to a Logic "0". And the analog equivalent of the stored address signal is continuously transmitted as a data signal at +OUT 131 and −OUT 133 as long as the latch control signal at AAS 19 remains a Logic "0".

More specifically, for a voltage data signal digital-to-analog converter 127 as described in the drawing includes but is not limited to the "AD558" digital-to-analog converter manufactured by Analog Devices, Inc. The "AD558" is a low-cost digital-to-analog converter that operates with a power supply of +5 to +15 Volts direct current and can be set up to output +10 Volts full scale. The "AD558" is packaged in a standard 16-pin DIP package for easy installation.

The "AD558" has a latch control circuit that operates in an inverted way to characteristics described above. The "AD558" follows when a latch control signal is a Logic "0", stores at a positive transition, and transmits stored data when a latch control signal is a Logic "1". Making the latch control circuit of "AD558" compatible with an address active signal from multipepser 87 at AAS 19 can be accomplished in two ways. In the first way an inverter (not shown) is connected along AAS 19 between multipepser 87 and digital-to-analog converter 127. In the second way the final inverter transmitting an address active signal to AAS 19 as part of multipepser 87 is removed. The effect of both ways is the same an address active signal at AAS 19 is compatible with the latch control circuit of "AD558".

Note that the digital inputs (at AAS 19 and AS0-AS5 95) for the "AD558" must be limited to +5 Volts direct current in order to operate. This limitation is generally referred to as "microprocessor compatible". Since multipepser 87 requires a minimum of +8 Volts direct current the digital inputs (at AAS 19 and AS0-AS5 95) must be routed through a buffer or voltage divider in order to limit the signals to less than +5 Volts direct current. A voltage divider for each digital input can consist of two 22k ohm resistors in series with the higher voltage input connected to one end of the resistor series, GND 93 connected to the other end of the resistor series and the inputs to the "AD558" connected to the junction of the two resistors. This type of voltage divider will reduce an 8 volt signal to 4 volts, which is acceptable.

For a current data signal digital-to-analog converter 127 as described in the drawing includes but is not limited to the "AD558" used in conjunction with the "AD693" 4-20 mA sensor transmitter manufactured by Analog Devices, Inc. The "AD693" is used as a voltage-to-current transmitter in this application and is compatible with the "AD558" if the "AD558" voltage signal is attenuated to below 60 mV full scale.

The "AD558" and "AD693" are described in detail as an example of a digital-to-analog converter 127 and in no way is meant to limit the selection to these particular devices. Those skilled in the arts understand that the variety of digital-to-analog converters with their associated support elements and transmitters is almost endless.

Interrupt timer 129 receives an address active signal from multipepser 87 at AAS 19 and transmits an inhibit control signal to multipepser 87 at INH 97. Recall from the previous figure that interrupt timer 129 stops a "bouncing" output by interrupting the operation of the invention after the first address active signal is transmitted from multipepser 87 at AAS 19. Recall also that the operation of the invention can be interrupted in a variety of ways including but not limited to resetting counter 103, disabling digital-to-analog converter 127, adding a gate to CLK 99 and disabling its conductance to multipepser 87, adding a gate to AAS 19 and disabling it, and inhibiting multipepser 87.

Interrupt timer 129 includes two-state circuits adapted to switch from a stable state to a non-stable state when edge triggered by a changing digital input signal and switch back to a stable state after a characteristic delay time. A circuit triggered by a falling signal is negative edge triggered while a circuit triggered by a rising signal is positive edge triggered. The delay time is a characteristic of the particular circuit determined primarily by the relative values of the supporting resistor-capacitor network.

Interrupt timer 129 generally includes but is not limited to monostables, timers, inverters, buffers, flip flops, logic gates, Schmitt triggers, edge detectors, edge triggers, and combinations thereof with their respective supporting circuits including a resistor-capacitor timing network. There are many appropriate devices with different characteristics that are commercially available or can be assembled from a few available parts.

It is difficult to specify the characteristics of interrupt timer 129 without limiting the scope of the invention unnecessarily. The particular device and its characteristics is not as important as the fact that it must be compatible with multipepser 87 and its interaction with the exciter (not shown). In order to limit the selection criteria, multipepser 87 is assumed to have characteristics as described above and in previous figures and to transmit a plurality of address active signals in quick succession at AAS 19 to digital-to-analog converter 127 if interrupt timer 129 is not included.

Interrupt timer 129 includes characteristics of negative edge triggering so that triggering occurs on the falling edge of the first address active signal control, a delay time slightly greater than the time it takes multipepser 87 to transmit the plurality of address active signals in quick succession, and an interrupt control signal that is compatible with the particular part of the invention that is interrupted.

Interrupt timer 129 is shown inhibiting multipepser 87 instead of another of the possible interruptable parts for four reasons. The first reason is to illustrate the versatility of multipepser 87 and strengthen its consideration as a separate building-block. The second reason is to standardize the length and process of the measurement cycle in order to preclude the cycle from being locked into a start-up/reset pattern. The third reason is to reduce the effect of noise on the operation of the invention as follows. Control circuits such as "reset" on counter 103, "latch" on digital-to-analog converter 127, and "store" on a storage register (not shown) are edge triggered and are therefore susceptible to false triggering by noise spikes and "glitches" whereas "inhibiting" multipepser 87 and "gating" the clock signal to multipepser 87 are both state triggered interruptions. It is generally more reliable to interrupt a state triggered function than an edge triggered function. The fourth reason is to keep the number of parts to a minimum; interrupting the clock signal requires an extra gate on CLK 99 besides interrupt timer 129.

Thus interrupt timer 129 is shown in the drawing transmitting an interrupt control signal to multipepser 87 at INH 97. Recall that if a Logic "0" inhibit control signal is conducted at INH 97 then multipepser 87 operates normally and if a Logic "1" inhibit control signal is conducted at INH 97 then multipepser 87 is inhibited and does not electrically energize PEPS array (not shown). For compatibility interrupt timer 129 must transmit a Logic "0" interrupt control signal when in a stable state and transmit a Logic "1" after triggering causes a temporary, unstable state.

In the operation of the preferred embodiment of the invention as described above clock signal generator 115 advances counter 103 causing it to address multipepser 87 with a predetermined sequence of address signals causing it to electrically energize each PEPS (not shown) in turn. When multipepser 87 electrically energizes nearest PEPS (not shown) a valid address active signal at AAS 19 transits from a Logic "0" to a Logic "1", remains as a Logic "1" while nearest PEPS is addressed, transits to a Logic "0" when nearest PEPS is no longer addressed, and remains a Logic "0" until nearest PEPS is addressed again. (Note that "valid" address active signal refers to the function of the clock signal in gating address active signal and is not included to avoid overcomplicating the description.) Thus a valid address active signal at AAS 19 functions as a latch control signal for digital-to-analog converter 127 causing it to transmits the analog equivalent of the stored address signal as a data signal at +OUT 131 and −OUT 133. Controller 125 then displays the analog equivalent of the address signal of nearest PEPS (not shown) thus displaying the position of the exciter (not shown) or object (not shown) connected thereto.

Referring now to FIG. 10, an application of the preferred embodiment of the invention includes PEPS array 1 arranged as a spiral including a plurality of PEPS 2 supported around support means 37 as a cylinder in determining the position of an exciter (not shown) that moves along path 7. This drawing is included in order to illustrate the versatility of the shape, size, and application of PEPS array 1, specifically that its design is not limited to a straight line shape.

In the operation of the invention PEPS array 1 is connected to a controller (not shown) at a plurality of conductors 135. The drawing is not more specific and more detailed in order not to detract from the discussion of PEPS array versatility.

Other similar treatments of the variations of PEPS array 1 are described in following figures. These specific variations are shown in order to illustrate the advantages that result from the invention's versatility and do not limit the invention to these variations.

The principal advantage of PEPS array 1 arranged as a spiral is that more PEPS 2 are included in PEPS array 1 per unit length of support means 37 with a resultant increase in resolution. Because of the digital measurement nature of the invention, the resolution of the position determination depends principally on the number of PEPS 2 comprising PEPS array 1 or more specifically the number of PEPS 2 contained along the intended path 7 of the exciter (not shown). Notice that each PEPS 2 is positioned a little farther along path 7 than the PEPS 2 before it and not quite as far along path 7 as the PEPS 2 after it.

PEPS array 1 arranged as a spiral meets the general criteria of a plurality of PEPS 2 fixedly supported by support means 37 along the intended path 7 of exciter (not shown) while being quite different in shape and form from PEPS array 1 of previos figures.

Referring now to FIG. 11 a cross-sectional drawing of an application of the preferred embodiment of the invention includes PEPS array 1 arranged as a spiral including a plurality of PEPS 2 supported around support means 37 as a cylinder in determining the position of an exciter 5 that moves along path 7. In this case PEPS array 1 is applied as a differential pressure transmitter 137 wherein a high pressure chamber 139 is separated from a low pressure chamber 141 by a flexible bellows 143. The top surface 145 of bellows 143 is attached to exciter 5 and both exciter 5 and top surface 145 move along path 7 according to the difference in pressure between the pressure contained within high pressure chamber 141 and the pressure contained within low pressure chamber 143.

The basic design of differential pressure transmitter 137 is well known to those skilled in the arts and the purpose of this drawing is to illustrate how PEPS array 1 in measuring the position of exciter 5 according to the preferred embodiment of the invention can be effectively applied to a variety of mechanical processes and measurement devices. Those skilled in the arts understand that measuring "position" is relatively unimportant in and of itself. Measuring position is valuable when the position is related to some other mechanical or physical property, in this case differential pressure. It is not the purpose of this description to try and delineate all the possible applications of a basic position measurement device such as PEPS array 1. It is the purpose of this description to show that PEPS array 1 is versatile, measuring relatively small displacements (about one inch) with PEPS array 1 as a closely packed spiral and measuring relatively large displacements (hundreds of feet) with PEPS array 1 as a widely spaced straight array.

Referring now to FIG. 12 a cross-sectional drawing of an application of the preferred embodiment of the invention includes PEPS array 1 arranged as a straight array including a plurality of PEPS 2 supported by support means 37 as a tube in determining the position of exciter 5 as a floating exciter that moves along path 7. In this case PEPS array 1 is applied in determining the level of a liquid 147 contained within a tank 149. Exciter 5 floats at a top surface 151 of liquid 147, moving along path 7 as the level of liquid 147 changes. Notice that PEPS 2 of PEPS array 1 are evenly spaced along path 7. This even spacing is referred to as linear, that is a increment of level change yeilds a constant increment of PEPS array 1 output change.

PEPS array 1 and the operation thereof is particularly suited to determining the level of liquid 147 contained in tanks 149 whether large or small. PEPS array 1 can be isolated from contact with liquid 147, which is often corrosive, explosive, dirty, pressurized, or combinations thereof. Further PEPS array 1 can be constructed for large tanks and with a wide range of resolutions.

Referring now to FIG. 13, a cross-sectional drawing of an application of the preferred embodiment of the invention includes PEPS array 1 arranged as a straight array including a plurality of PEPS 2 supported by support means 37 as a tube in determining the position of exciter 5 as a floating exciter that moves along path 7. In this case PEPS array 1 is applied in determining the level of a liquid 147 contained within a tank 149 as in the previous figure. Notice that PEPS 2 of PEPS array 1 are unevenly spaced along path 7. This uneven spacing is referred to as nonlinear, that is a increment of level change yeilds an increment of PEPS array 1 output change that is dependent on the existing level.

The purpose of this drawing is to illustrate that PEPS array 1 can be constructed for almost any position application. There are many industrial processes that are nonlinear by nature and it is difficult to adapt existing position sensors to these nonlinear processes. PEPS array 1 can be customized for a nonlinear process by spacing each PEPS 2 according to the nonlinearity of the process no matter how complex. This is particularly suited for process control where the feedback must be more resolute at particular positions along path 7 of the process.

For example, in the drawing PEPS array 1 has more resolution as exciter 5 as a floating exciter reaches the top of tank 149. Suppose that the main concern of the process is that tank 149 be exactly ninety-five percent full but definitely not overfull. As tank 149 is filling with liquid 147 the concern and therefore the most resolution is required at the top of tank 149 which is where PEPS array 1 is more resolute therefore giving better results and more resolute feedback. At the bottom of tank 149 as liquid 147 is just starting to fill the concern is not as great and PEPS array 1 is less resolute as required.

What I claim is:

1. A PEPS array for use with an electrically powered external controller that electrically energizes a combination of one of a plurality of row outputs and one of at least one column outputs as directed by internally generated address signals, generates an address active signal when an electrical status current exceeds an electrical reference current and is an active status current, and displays the address signal that corresponds to said address active signal in determining the position of a physical exciter moving along an intended path, comprising:
   a) a plurality of PEPS each of which achieves an active state and conducts said active status current only if electrically energized and physically excited, connected as a plurality of rows connected to said row outputs and at least one column connected to said column outputs such that each PEPS is electrically connected to a unique combination of one of said rows and one of said columns, electrically energized by said controller one of said PEPS at a time, such that each of said PEPS is electrically energized in turn; and
   b) support means to fixedly support said plurality of PEPS in a spaced relationship along said intended path and in close proximity to said exciter such that said exciter physically excites only the nearest PEPS and only said nearest PEPS can achieve said active state thereby causing said controller to display the address signal that corresponds to said nearest PEPS whereby the position of said exciter is directly related to the address signal which is displayed.

2. The PEPS array of claim 1 wherein each of said plurality of PEPS includes at least one physicoelectric device with two electrical connections, a row line connected to one of said row outputs and a column line connected to one of said column outputs, and said status current conducts through said row outputs and said column outputs.

3. The PEPS array of claim 1 wherein each of said plurality of PEPS includes at least one physicoelectric device with three electrical connections, a row line connected to one of said row outputs, a column line connected to one of said column outputs, and a sensor output connected to an array output and said status current conducts through said array output.

4. The PEPS array of claim 1 wherein each of said plurality of PEPS includes at least one physicoelectric device with four electrical connections, a row line connected to one of said row outputs, a column line connected to one of said column outputs, a first sensor output connected to a first array output and a second sensor output connected to a second array output and said status current conducts through said array outputs.

5. The PEPS array of claim 1 wherein each of said plurality of PEPS includes an electric circuit that conducts said status current as an analog electrical signal.

6. The PEPS array of claim 1 wherein each of said plurality of PEPS includes an electric circuit that conducts said status current as a current sourcing digital electrical signal.

7. The PEPS array of claim 1 wherein each of said plurality of PEPS includes an electric circuit that conducts said status current as a current sinking digital electrical signal.

8. The PEPS array of claim 1 wherein each of said plurality of PEPS includes means to enhance the process of exciting by said physical exciter.

9. The PEPS array of claim 1 for use in determining the position of a magnetic exciter moving along an intended path wherein each of said plurality of PEPS includes at least one magnetoelectric device.

10. The PEPS array of claim 9 wherein said magnetoelectric device includes a reed switch.

11. The PEPS array of claim 9 wherein said magnetoelectric device includes a magnetoresistive element.

12. The PEPS array of claim 9 wherein said magnetoelectric device includes a magnetoresistive proximity sensor.

13. The PEPS array of claim 9 wherein said magnetoelectric device includes a Hall effect magnetic proximity sensor.

14. The PEPS array of claim 9 wherein each of said plurality of PEPS includes at least one pole piece that enhances the physical exciting by said magnetic exciter.

15. The PEPS array of claim 9 wherein each of said plurality of PEPS includes at least one bias magnet that enhances the physical exciting by said magnetic exciter.

16. The PEPS array of claim 1 for use in determining the position of an optoelectronic exciter moving along an intended path wherein each of said plurality of PEPS includes at least one optoelectronic device.

17. The PEPS array of claim 16 wherein each of said plurality of PEPS includes at least one lens that enhances the physical exciting by said optoelectronic exciter.

18. The PEPS array of claim 1 for use in determining the position of a capacitive exciter moving along an intended path wherein each of said plurality of PEPS includes at least one electrocapacitive device.

19. The PEPS array of claim 1 for use in determining the position of an inductive exciter moving along an intended path wherein each of said plurality of PEPS includes at least one electroinductive device.

20. The PEPS array of claim 1 for use in determining the position of an eddy current exciter moving along an intended path wherein each of said plurality of PEPS includes at least one eddy current sensor.

21. The PEPS array of claim 1 wherein said support means supports said plurality of PEPS in an evenly spaced, linear relationship along said controlled path of said physical exciter.

22. The PEPS array of claim 1 wherein said support means supports said plurality of PEPS in a non-linear spaced relationship along said controlled path of said physical exciter.

23. The PEPS array of claim 1 wherein said support means comprises materials that do not interfere with physically exciting said plurality of PEPS with said exciter, said materials generally including epoxy, glass, ceramics, silicon based substrates, and printed circuit boards and specifically including stainless steel, aluminum, brass, composite materials, and paper for a magnetic exciter and an inductive exciter and specifically including plastic and fiberglass for a capacitive exciter.

24. A position sensor for use with an electrically powered external controller that electrically energizes a combination of one of a plurality of row outputs and one of at least one column outputs as directed by internally generated address signals, generates an address active signal when an electrical status current exceeds an electrical reference current and is an active status current, and displays the address signal that corresponds to said address active signal, in determining the position of an object moving along an intended path, comprising:
   a) a plurality of PEPS each of which achieves an active state and conducts said active status current only if electrically energized and physically excited, connected as a plurality of rows connected to said row outputs and at least one column connected to said column outputs such that each PEPS is electrically connected to a unique combination of one of said rows and one of said columns, electrically energized by said controller one of said PEPS at a time, such that each of said PEPS is electrically energized in turn;
   b) support means to fixedly support said plurality of PEPS in a spaced relationship along said controlled path of said object;
   c) an exciter, joined to said object, arranged to move along a controlled path in close proximity to said plurality of PEPS, physically exciting only the nearest PEPS, only said nearest PEPS achieving said active state, thereby causing said controller to display the address signal that corresponds to said nearest PEPS whereby the position of said object is directly related to the address signal displayed.

25. The position sensor of claim 24 wherein said exciter generates a physical force field and includes magnets, electromagnets, and induction coils.

26. The position sensor of claim 24 wherein said exciter perturbs an existing physical force field and includes pole pieces, gear tooth pieces, capacitive plates and eddy current plates.

27. The position sensor of claim 24 wherein said exciter generates electromagnetic radiation and includes heated filaments and light emitting diodes.

28. The position sensor of claim 24 wherein said exciter perturbs an existing beam of radiation and includes lenses and reflecting surfaces.

29. A position sensor for use with an electrically powered external controller that supplies electric power, generates and transmits address signals, generates an address active signal when an electrical status current exceeds an electrical reference current and is an active status current, and displays the address signal being transmitted when said address active signal is generated, in determining the position of an object moving along an intended path, comprising:
   a) a plurality of PEPS each of which achieves an active state and conducts said active status current only if electrically energized and physically excited, connected as a plurality of rows and at least one column such that each PEPS is electrically connected to a unique combination of one of said rows and one of said columns;
   b) a support means to fixedly support said plurality of PEPS in a spaced relationship along said controlled path of said object;
   c) a driver, supported by said support means, electrically connected to said controller and to said plurality of PEPS at a plurality of rows and at least one column, receiving said sequence of address signals and said power, addressing a combination of one of said rows and one of said columns thereby electrically energizing the addressed PEPS, and directed by said sequence of address signals to electrically energize said plurality of PEPS, one PEPS at a time, such that each of said PEPS is electrically energized in turn; and
   d) an exciter, joined to said object, arranged to move along a controlled path in close proximity to said plurality of PEPS, physically exciting only the nearest PEPS, only said nearest PEPS achieving said active state, thereby causing said controller to display the address signal that corresponds to said nearest PEPS whereby the position of said object is directly related to the address signal displayed.

30. The position sensor of claim 29 wherein said plurality of PEPS are connected as a plurality of rows and a column and said driver includes a row driver electrically connected to said plurality of rows and a permanent conductor electrically connected to said column.

31. The position sensor of claim 29 wherein said plurality of PEPS are connected as a plurality of rows and a plurality of columns and said driver includes a row driver electrically connected to said plurality of rows and a column driver electrically connected to said plurality of columns.

32. The position sensor of claim 29 for use with a manually operated electrically powered external controller wherein said driver includes at least one manually operated electrically conductive probe receiving said power, addressing said combination by manual contact, and manually moved to each combination in turn.

33. The position sensor of claim 29 for use with a manually operated electrically powered external controller wherein said driver includes at least one manually operated selector switch receiving said power at a common pole, addressing said combination by internal switch contacts, and manually switched to each combination in turn.

34. The position sensor of claim 29 for use with a digitally operated electrically powered external controller wherein said driver includes at least one digital electrical selector switch receiving said power at a common input terminal, addressing said combination by integrated circuitry to select one of a plurality of output terminals, and switched to each combination in turn by receiving binary coded digital electric address signals.

35. The position sensor of claim 29, further including a converter in electrical interaction with said addressed PEPS, supported by said support means and including an electric circuit wherein said active status current is converted into an active status signal that is transmitted to said controller and recognized by said controller as an indication that said addressed PEPS has acheived said active state, whereby said converter converts said active status current to a form more easily recognizable by said controller.

36. The position sensor of claim 35 for use with a manually operated electrically powered external controller, wherein said converter transmits said active status signal in a form that is recognized by human senses and includes electric circuits that emit visible light such as electric lamps and light-emitting diodes, circuits that emit audible sound such as piezoelectric buzzers, circuits that deflect in proportion to the flow of current therein such as milliammeters and combinations of a voltage divider and a voltmeter.

37. The position sensor of claim 35 for use with a digitally operated electrically powered external controller, wherein said converter transmits said active status signal as a digital electric signal and includes a voltage divider circuit and a voltage comparator, said divider circuit connected to conduct said status current to said comparator from which said active status signal is transmitted.

38. The position sensor of claim 35 for use with a digitally operated electrically powered external controller, wherein said converter transmits said active status signal as a digital electric signal and includes a digital building-block and supporting resistive elements, receiving said status current and transmitting said active status signal, said building-block including a digital logic gate, a Schmitt trigger, a flip flop, and combinations thereof, whereby said active status signal is a clean digital signal.

39. The position sensor of claim 35 for use with a digitally operated electrically powered external controller that further transmits a clock signal wherein said converter transmits said active status signal as a digital electric signal and includes a clocked digital building-block, receiving said status current and said clock pulse and transmitting said active status signal, said clocked digital building-block being characterized by a digital logic gate, a Schmitt trigger, a flip flop, and combinations thereof, whereby said active status signal is a clean, clocked, digital signal.

40. A position transmitter for use with an electrically powered external controller that supplies electric power, transmits a controller clock signal, receives a data signal as a string of data pulses followed by at least one missing pulse, and displays the number of data pulses in said string, in determining the position of an object moving along an intended path, comprising:
 a) a plurality of PEPS each of which achieves an active state and conducts an active status current only if electrically energized and physically excited, connected as a plurality of rows and a plurality of columns such that each PEPS is electrically connected to a unique combination of one of said rows and one of said columns;
 b) a support means to fixedly support said plurality of PEPS in a spaced relationship along said controlled path of said object;
 c) a processor, supported by said support means, receiving said controller clock signal, a data transmit signal and an address active signal, transmitting said data signal, a processor clock signal, a driver inhibit signal, and a counter reset signal, and including a set of digital building blocks to convert said address active signal to said counter reset signal, to convert said data transmit signal to said driver inhibit signal, to convert said controller clock signal to a processor clock signal and to transmit said processor clock signal as a data signal as directed by said data transmit signal;
 d) a counter, supported by said support means, receiving said processor clock signal and said counter reset signal, transmitting a repeating sequence of address signals, starting with a first address signal, progressing to successive address signals as successive clock signals are received, and returning to said first address signal, and returning to said first address signal as directed by said counter reset signal;
 e) a driver, supported by said support means, electrically connected to said plurality of PEPS at a plurality of rows and a plurality of columns, receiving said sequence of address signals, said driver inhibit signal and said power, addressing a combination of one of said rows and one of said columns thereby electrically energizing the addressed PEPS, and directed by said sequence of address signals and said driver inhibit signal to electrically energize said plurality of PEPS, one PEPS at a time, such that each of said PEPS is electrically energized in turn;
 f) a converter in electrical interaction with said addressed PEPS, supported by said support means, receiving said processor clock signal and including an electric circuit wherein said active status current is converted into an address active signal that is transmitted to said processor and recognized by it as an indication that said addressed PEPS has acheived said active state; and
 g) an exciter, joined to said object, arranged to move along a controlled path in close proximity to said plurality of PEPS, physically exciting only the nearest PEPS, only said nearest PEPS achieving said active state, whereby said controller is connected to said transmitter and the position of said object is proportional to the number of said data pulses in said string.

41. The position transmitter of claim 40 wherein said processor is adapted with an electric circuit to receive said controller clock signal and transmit said data signal as electrical pulses via electrically conducting wires.

42. The position transmitter of claim 40 wherein said processor includes an electric circuit to receive said controller clock signal and transmit said data signal as pulses of light and further including an optoelectronic converter in electrical connection with said controller to convert said pulses of light to electrical pulses, and a channelling means, in physical connection with said optoelectronic converter and said processor to direct said pulses of light, wherein said channelling means includes a hollow conduit made of an opaque material and having therein an optical channel to direct said pulses of light and an optical fiber having therein an optical pathway to direct said pulses of light.

43. The position transmitter of claim 40 wherein said processor includes an electric circuit to receive said controller clock signal and transmit said data signal as radio wave pulses and further including an radio wave converter in electrical connection with said controller to convert said radio wave pulses to electrical pulses.

44. The position transmitter of claim 40 wherein said processor includes an electric circuit to receive said controller clock signal and transmit said data signal as pulses of pressure and further including an pressure converter in electrical connection with said controller to convert said pulses of pressure to electrical pulses, and a channelling means, in physical connection with said pressure converter and said processor, including a tube filled with an incompressible fluid, to direct said pulses of pressure.

45. The position transmitter of claim 40 wherein said processor includes a clock signal generator to generate said processor clock signal and said controller clock signal, whereby said controller clock signal is no longer connected to said transmitter and said controller is connected to said transmitter and the position of said object is proportional to the number of said data pulses in said string.

46. The position transmitter of claim 40 further including a self-contained power supply, whereby said power from said controller is no longer connected to said transmitter and said controller is connected to said transmitter and the position of said object is proportional to the number of said data pulses in said string.

47. A position transmitter for use with an electrically powered external controller that supplies electric power, receives an electrical data signal, and displays the value of said data signal, in determining the position of an object moving along an intended path, comprising:
  a) a plurality of PEPS each of which achieves an active state and conducts an active status current only if electrically energized and physically excited, connected as a plurality of rows and at least one column such that each PEPS is electrically connected to a unique combination of one of said rows and one of said columns;
  b) a clock signal generator, generating a clock signal as a stream of digital electrical pulses;
  c) a counter, receiving said clock signal and transmitting a repeating sequence of address signals, starting with a first address signal, progressing to successive address signals as successive clock signals are received, and returning to said first address signal;
  d) a driver, electrically connected to said plurality of PEPS at a plurality of rows and at least one column, receiving said sequence of address signals and said power, addressing a combination of one of said rows and one of said columns thereby electrically energizing the addressed PEPS, and directed by said sequence of address signals to electrically energize said plurality of PEPS, one PEPS at a time, such that each of said PEPS is electrically energized in turn;
  e) a converter in electrical interaction with said addressed PEPS, supported by said support means, receiving said clock signal and including an electric circuit wherein an address active signal is generated when an electrical status current exceeds an electrical reference current and is an active status current;
  f) a storage register, receiving said sequence of address signals and said address active signal to store the address signal that corresponds to said address active signal and continuously transmit the stored address signal as said data signal to said controller;
  g) a support means to fixedly support said plurality of PEPS in a spaced relationship along said controlled path of said object and to support said clock signal generator, said counter, said driver, said converter, and said storage register; and
  h) an exciter, joined to said object, arranged to move along a controlled path in close proximity to said plurality of PEPS, physically exciting only the nearest PEPS, only said nearest PEPS achieving said active state, whereby the position of said object is proportional to said stored address signal.

48. The position transmitter of claim 47 further including a digital-to-analog converter, supported by said support means, receiving said stored address signal from said storage register, converting said stored address signal into an electrical analog signal, and transmitting said analog signal as said data signal to said controller, whereby the position of said object is proportional to the equivalent value of said analog signal.

49. The position transmitter of claim 47 further including an interrupt timer, supported by said support means, receiving said address active signal, being triggered by the end of said address active signal to transmit an inhibit control signal to said driver so as to inhibit the operation of said driver, said inhibit control signal being transmitted for a characteristic delay time.

50. The position transmitter of claim 47 wherein said storage register includes an electric circuit to transmit said data signal as signals of light and further including an optoelectronic converter in electrical connection with said controller to convert said signals of light to digital electrical signals, and a channelling means, in physical connection with said optoelectronic converter and said storage register to direct said signals of light, wherein said channelling means includes a hollow conduit made of an opaque material and having therein an optical channel to direct said signals of light and an optical fiber having therein an optical pathway to direct said signals of light.

* * * * *